(12) United States Patent
Mukasa

(10) Patent No.: US 12,072,526 B2
(45) Date of Patent: *Aug. 27, 2024

(54) OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,503

(22) Filed: Jun. 1, 2023

(65) Prior Publication Data

US 2023/0324606 A1 Oct. 12, 2023

Related U.S. Application Data

(63) Continuation of application No. 17/655,486, filed on Mar. 18, 2022, now Pat. No. 11,709,313, which is a (Continued)

(30) Foreign Application Priority Data

Mar. 8, 2018 (JP) .................. 2018-041711

(51) Int. Cl.
*G02B 6/02* (2006.01)
*G02B 6/036* (2006.01)

(52) U.S. Cl.
CPC ........... *G02B 6/03633* (2013.01); *G02B 6/02* (2013.01); *G02B 6/02004* (2013.01); (Continued)

(58) Field of Classification Search
CPC .. G02B 6/02; G02B 6/02004; G02B 6/02214; G02B 6/036; G02B 6/03633; G02B 6/0365

See application file for complete search history.

(56) References Cited

U.S. PATENT DOCUMENTS

| 7,187,833 B2 | 3/2007 | Mishra |
| 7,574,088 B2 | 8/2009 | Sugizaki |

(Continued)

FOREIGN PATENT DOCUMENTS

| JP | 2006-154713 A | 6/2006 |
| JP | 2007-33466 A | 2/2007 |

(Continued)

OTHER PUBLICATIONS

Office Action issued May 9, 2023 in Japanese Patent Application No. 2021-110724, with an English translation.

(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a core portion made of glass; and a cladding portion made of glass, having a refractive index lower than the refractive index of the core portion, and positioned on an outer periphery of the core portion. Further, the cladding portion has an outer diameter smaller than 100 μm, and the core portion has a relative refractive-index difference of 0.32% to 0.40% with respect to the cladding portion.

12 Claims, 18 Drawing Sheets

Related U.S. Application Data continuation of application No. 17/011,665, filed on Sep. 3, 2020, now Pat. No. 11,314,017, which is a continuation of application No. PCT/JP2019/007869, filed on Feb. 28, 2019.

(52) U.S. Cl.
CPC ........... G02B 6/036 (2013.01); G02B 6/0365 (2013.01); *G02B 6/02214* (2013.01)

(56) References Cited

U.S. PATENT DOCUMENTS

| | | |
|---|---|---|
| 7,583,878 B2 | 9/2009 | Sugizaki |
| 7,603,015 B2 | 10/2009 | Bickham |
| 7,620,282 B2 | 11/2009 | Bickham |
| 7,844,155 B2 | 11/2010 | Bickham |
| 8,200,057 B2 | 6/2012 | Han |
| 8,385,701 B2 | 2/2013 | Bookbinder |
| 8,693,834 B2 | 4/2014 | Bickham |
| 8,724,954 B2 | 5/2014 | Konishi |
| 8,737,793 B2 | 5/2014 | Imamura |
| 8,837,892 B2 | 9/2014 | Bennett |
| 8,904,326 B2 | 12/2014 | Huang |
| 8,995,803 B2 | 3/2015 | Bickham |
| 9,341,771 B2 | 5/2016 | Molin |
| 11,314,017 B2 * | 4/2022 | Mukasa ................ G02B 6/0365 |
| 11,709,313 B2 * | 7/2023 | Mukasa ............. G02B 6/02004 385/127 |
| 2006/0034575 A1 | 2/2006 | Sako et al. |
| 2011/0058780 A1 | 3/2011 | Han et al. |
| 2011/0229101 A1 | 9/2011 | De Montmorillon et al. |
| 2013/0094819 A1 | 4/2013 | Konishi |
| 2017/0285257 A1 | 10/2017 | Maruyama et al. |

FOREIGN PATENT DOCUMENTS

| | | |
|---|---|---|
| JP | 2009-8850 A | 1/2009 |
| JP | 2015-45704 A | 3/2015 |
| JP | 2019-158941 A | 9/2019 |
| WO | WO 2005/012967 A1 | 2/2005 |
| WO | WO 2016/190297 A1 | 12/2016 |

OTHER PUBLICATIONS

Japanese Office Action issued Nov. 29, 2022 in Japanese Patent Application No. 2021-110724 (with English translation), 6 pages.
Extended European Search Report issued Oct. 12, 2021 in corresponding European Patent Application No. 19764150.9, 10 pages.
International Search Report issued May 28, 2019 in PCT/JP2019/007869 filed Feb. 28, 2019, 2 pages.
Tomotaka Murase, et al., "Development of Small Diameter Optical Fiber" Electric wire review of SWCC Showa Holdings Co., Ltd., vol. 53, No. 1, 2003, 16 pages (with Machine Generated English Translation).
Japanese Office Action issued Jun. 21, 2022 in Japanese Patent Application No. 2021-110724 (with unedited computer generated English translation), 10 pages.
Japanese Office Action issued May 31, 2022 in Japanese Patent Application No. 2018-41711 (with unedited computer generated English Translation), 18 pages.

* cited by examiner

OPTICAL FIBER

CROSS-REFERENCE TO RELATED APPLICATION(S)

This application is a continuation of U.S. application Ser. No. 17/655,486, filed Mar. 18, 2022, which is a continuation of U.S. application Ser. No. 17/011,665, filed Sep. 3, 2020 (now U.S. Pat. No. 11,314,017), which is a continuation of International Application No. PCT/JP2019/007869, filed on Feb. 28, 2019 which claims the benefit of priority of the prior Japanese Patent Application No. 2018-041711, filed on Mar. 8, 2018, the entire contents of which are incorporated herein by reference.

BACKGROUND

The present disclosure relates to an optical fiber.

In the datacom and telecom fields, a small-diameter optical fiber has attracted attention as an optical fiber that achieves a high-density optical fiber cable. In the related art, a configuration in which a core portion has a high relative refractive-index difference with respect to a cladding portion has been disclosed for the small-diameter optical fiber (Murase et al., "Development of small-diameter clad fiber", Showa Electrical Wire review, vol. 53, No. 1 (2003), pp. 32-36). In addition, a configuration in which a trench layer is provided adjacent to the core portion has been disclosed (International Publication No. WO 2016/190297).

SUMMARY

There is a need for providing a small-diameter optical fiber having a reduced leakage loss.

According to an embodiment, an optical fiber includes: a core portion made of glass; and a cladding portion made of glass, having a refractive index lower than the refractive index of the core portion, and positioned on an outer periphery of the core portion. Further, the cladding portion has an outer diameter smaller than 100 µm, and the core portion has a relative refractive-index difference of 0.32% to 0.40% with respect to the cladding portion.

DETAILED DESCRIPTION

Figure 1:
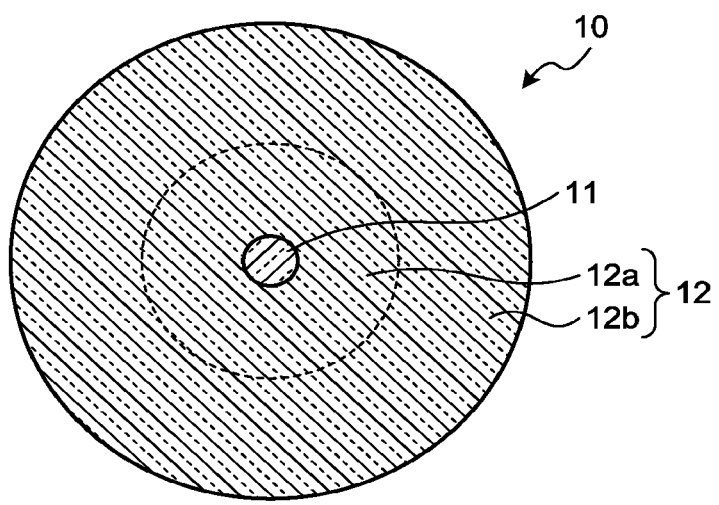
FIG. 1 is a schematic cross-sectional view of an optical fiber according to a first embodiment.

In the related art, characteristics of an optical fiber disclosed in Murase et al., "Development of small-diameter clad fiber", Showa Electrical Wire review, vol. 53, No. 1 (2003), pp. 32-36 do not satisfy, for example, a typical single-mode optical-fiber standard (hereinafter referred to as G.650.2 standard) defined by ITU-T (International Telecommunication Union) G.650.2. In addition, characteristics of an optical fiber disclosed in International Publication No. WO 2016/190297 satisfy G.650.2 standard but the outer diameter (fiber diameter) of the cladding portion is 100 µm to 125 µm approximately, which is insufficient for diameter reduction that will be further increasingly required. In addition, a leakage loss increases as the diameter of an optical fiber is reduced, but no optical fiber having a leakage loss reduced to a sufficiently small value and having a small diameter has been disclosed.

Embodiments of the present disclosure will be described below in detail with reference to the accompanying drawings. In addition, the present disclosure is not limited by the embodiments described below. In the drawings, components identical or corresponding to each other are denoted by an identical reference sign as appropriate. In addition, in the present specification, a cutoff wavelength is a cable cutoff wavelength defined by ITU-T G.650.1. In addition, other terms not particularly defined in the present specification are subjected to definitions and measurement methods in G.650.1.

First Embodiment

FIG. 1 is a schematic cross-sectional view of an optical fiber according to a first embodiment. This optical fiber 10 includes a core portion 11 positioned substantially at the center of the optical fiber 10, and a cladding portion 12 positioned on the outer periphery of the core portion 11. The cladding portion 12 includes an adjacent region 12a adjacent to and surrounding the outer periphery of the core portion 11, and a non-adjacent region 12b positioned on the outer periphery of the adjacent region 12a and adjacent to and surrounding the outer periphery of the adjacent region 12a. In other words, the adjacent region 12a is interposed between the core portion 11 and the non-adjacent region 12b.

The core portion 11 and the cladding portion 12 are each made of silica-based glass. For example, the core portion 11 is made of silica glass to which a dopant such as germanium (Ge) is added to increase the refractive index. The cladding portion 12 has a refractive index lower than the refractive index of the core portion 11. In addition, in the optical fiber 10, the adjacent region 12a and the non-adjacent region 12b of the cladding portion 12 are each made of pure silica glass containing no refractive index adjustment dopants such as Ge and fluorine (F).

Note that a coating made of, for example, resin is formed to cover the outer periphery of the cladding portion 12 when the optical fiber 10 is used. The coating is made of, for example, UV curable resin and has a layer structure of one layer or two or more layers. The UV curable resin is, for example, urethane acrylate series, polybutadiene acrylate series, epoxy acrylate series, silicone acrylate series, or polyester acrylate series, but is not particularly limited as long as it is used for optical-fiber coating. In addition, in the optical fiber 10, focus is on diameter reduction of the core portion 11 and the cladding portion 12 as glass parts, and thus the outer diameter of the cladding portion 12 is defined to be a fiber diameter as a diameter reduction target.

Figure 2A:
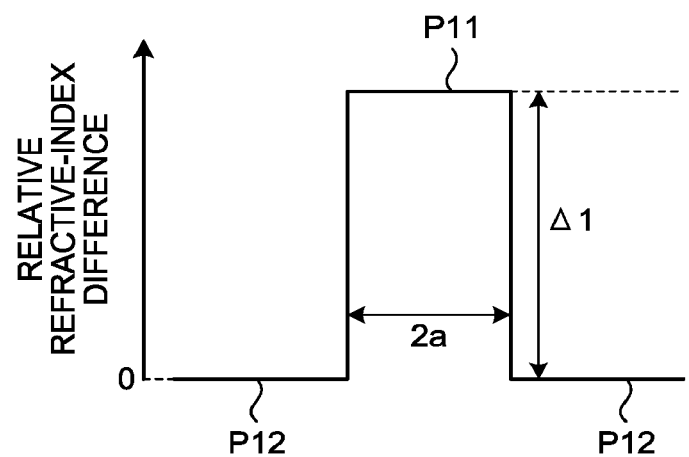
FIG. 2A is a diagram illustrating the refractive index profile of the optical fiber illustrated in FIG. 1.
Figure 2B:
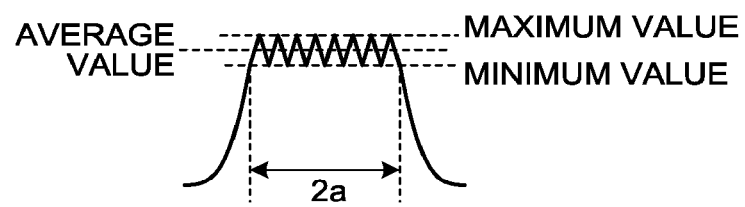
FIG. 2B is a diagram illustrating the refractive index profile of the optical fiber illustrated in FIG. 1.

FIGS. 2A and 2B are each a diagram illustrating a refractive index profile in the radial direction from the central axis of the optical fiber 10. In FIG. 2A, a profile P11 illustrates the refractive index profile of the core portion 11, and a profile P12 illustrates the refractive index profile of the cladding portion 12. Note that each refractive index profile is indicated as a relative refractive-index difference with respect to the cladding portion 12. As illustrated in FIG. 2A, the optical fiber 10 has a step-type refractive index profile, the diameter (core diameter) of the core portion 11 is 2a, and the relative refractive-index difference of the core portion 11 with respect to the cladding portion 12 is Δ1.

Note that, as illustrated in FIG. 2B, the refractive index profile of the core portion 11 is not always of a step type having a geometrically ideal shape, but the shape of a top part is not flat and has irregularities formed due to manufacturing characteristics or has a skirt from the top part in some cases. In such a case, the value of at least part of the top part of the refractive index profile in the range of the core diameter 2a in manufacturing design is an index that determines Δ1.

Subsequently, designing for reduction of the diameter of the optical fiber 10 will be described below. In the optical fiber 10, an optical property as a restriction on diameter reduction is a leakage loss due to light leakage. A structure that is dominant to the leakage loss and other characteristics is the structure of the core portion 11. Thus, a minimum fiber diameter (threshold fiber diameter) necessary for obtaining a leakage loss equal to or smaller than 0.001 dB/km at a wavelength of 1625 nm was studied through simulation calculation by changing the relative refractive-index difference Δ1 and the core diameter 2a of the core portion 11. The leakage loss may be measured as a difference in the transmission loss at 1625 nm between an optical fiber having a clad diameter that is large enough to avoid an increase in the leakage loss and an optical fiber having an actual fiber diameter, both optical fibers having the same profile.

The study was made on an optical fiber that satisfies standards (1) to (5) according to G.652 standard, as follows: (1) have a mode field diameter (MFD) of 8.6 μm to 9.5 μm at a wavelength of 1310 nm; (2) have a bending loss equal to or smaller than $5.3 \times 10^{-3}$ dB/m at a wavelength of 1550 nm when bent at a diameter of 60 mm; (3) have a zero-dispersion wavelength of 1300 nm to 1324 nm; (4) have a dispersion slope equal to or smaller than 0.092 ps/nm$^2$/km; and (5) have a cable cutoff wavelength equal to or shorter than 1260 nm at the zero-dispersion wavelength.

Figure 3:
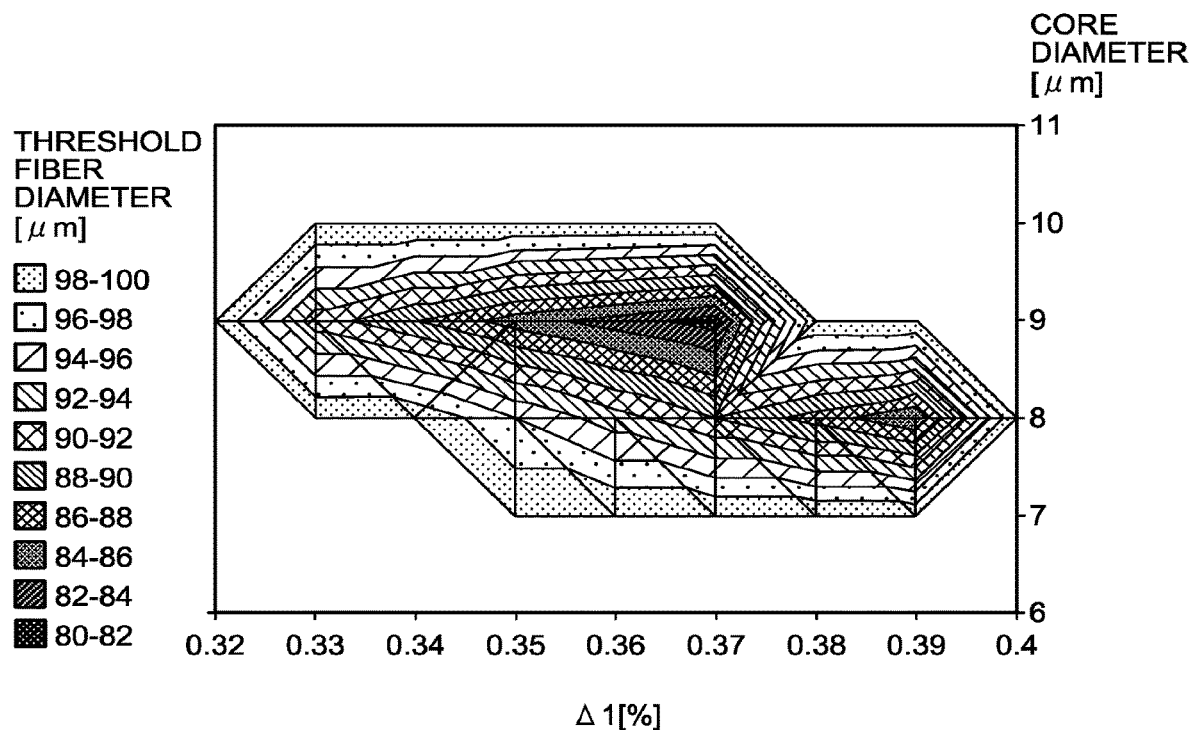
FIG. 3 is a diagram illustrating the relation of a threshold fiber diameter with Δ1 and a core diameter.

FIG. 3 is a diagram illustrating the relation of the threshold fiber diameter with Δ1 and the core diameter. As illustrated in FIG. 3, it can be understood that there is a condition that the leakage loss can be sufficiently reduced by optimizing Δ1 and the core diameter as parameters of the core portion 11 when the fiber diameter is smaller than the threshold fiber diameter of 100 μm. Accordingly, it is possible to satisfy G.652 standard and also achieve diameter reduction to a fiber diameter smaller than 100μ as compared to a optical fiber in the related art. Specifically, a small-diameter optical fiber 10 satisfying G.652 standard, having a reduced leakage loss, and having a fiber diameter smaller than 100 μm can be achieved by having Δ1 of 0.32% to 0.40% and a core diameter of 7 μm to 10 μm. The fiber diameter smaller than 100 μm is significantly smaller than 125 μm, which is the fiber diameter of a typical optical fiber. Note that the coating structure (properties and thickness) and the like are not particularly limited but, for example, as publicly known, it is preferable to use a coating structure and the like appropriately set to reduce a microbending loss and the like.

In addition, as described above, the top part of the refractive index profile of the core portion 11 of the optical fiber 10 does not necessarily has a flat shape, but leakage-loss and small-diameter characteristics can be obtained when at least part of the top part, specifically, a region of the top part determines that Δ1 has a relative refractive-index difference of 0.32% to 0.40%. More preferably, a region of 50% or more of the top part has a relative refractive-index difference of 0.32% to 0.40%. In addition, the relative refractive-index difference of the top part in the range of the core diameter 2a in manufacturing design more preferably has an average value, a maximum value, and a minimum value of 0.32% to 0.40% to obtain desired characteristics.

In addition, influence of the coating and influence of the microbending loss and the like occur in addition to influence of the leakage loss when actual manufacturing of a cable of the optical fiber 10 is taken into consideration. Thus, it is preferable to have a design with which 90 μm or smaller with an allowance of 10% approximately to 100 μm can be achieved as the fiber diameter. It is preferable from the results of FIG. 2 that the core portion 11 has Δ1 of 0.335% to 0.375% and a core diameter of 8.2 μm to 9.2 μm or has Δ1 of 0.37% to 0.395% and a core diameter of 7.6 μm to 8.3 μm.

Second Embodiment

Similarly to the optical fiber 10 according to the first embodiment, an optical fiber according to a second embodiment includes a core portion made of silica glass and a cladding portion made of silica-based glass, and the cladding portion includes an adjacent region and a non-adjacent region. In addition, a coating is formed to cover the outer periphery of the cladding portion.

Figure 4:
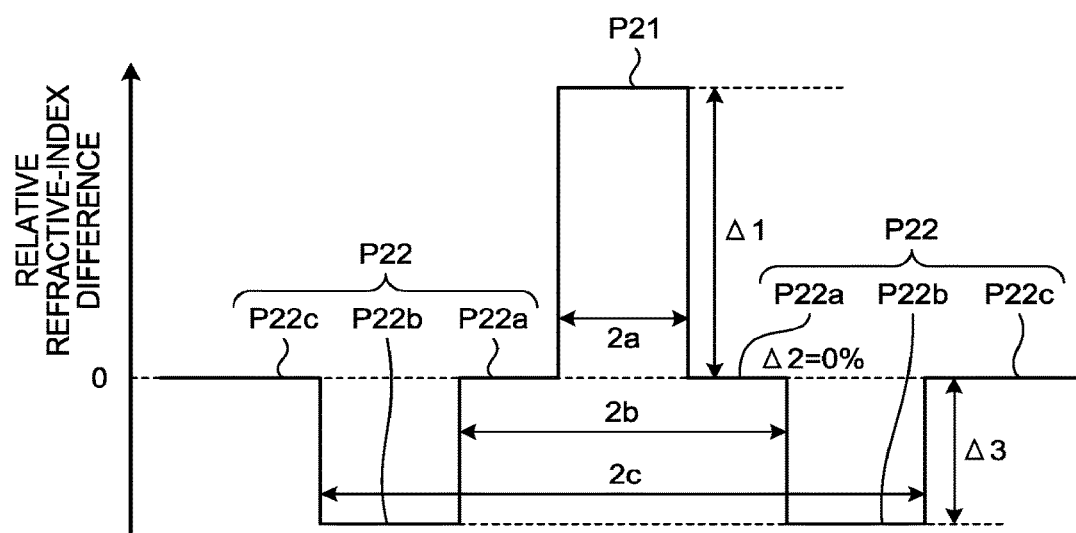
FIG. 4 is a diagram illustrating the refractive index profile of an optical fiber according to a second embodiment.

FIG. 4 is a diagram illustrating the refractive index profile of the optical fiber according to the second embodiment in the radial direction from the central axis. In FIG. 4, a profile P21 illustrates the refractive index profile of the core portion, and a profile P22 illustrates the refractive index profile of the cladding portion. Note that each refractive index profile is indicated as a relative refractive-index difference Δ.

As indicated by the profile P22, the cladding portion includes three layers having profiles P22a, P22b, and P22c, respectively. The profile P22a is the refractive index profile of the adjacent region, and the adjacent region is made of pure silica glass. The profile P22b is the refractive index profile of a layered region to which a dopant such as F is added to decrease the refractive index in the non-adjacent region and that concentrically surrounds the core portion. This region is referred to as a trench layer. The profile P22c is the refractive index profile of a region positioned on the outer periphery of the trench layer in the non-adjacent region and the outer diameter of which determines the fiber diameter. This region is made of pure silica glass and is a reference refractive index region.

As illustrated in FIG. 4, the optical fiber according to the second embodiment has a trench-type refractive index profile, the core diameter of the core portion is 2a, and the relative refractive-index difference of the core portion with respect to the adjacent region is Δ1. The relative refractive-index difference of the adjacent region with respect to the reference refractive index region is Δ2, which is 0% in the present embodiment. The relative refractive-index difference of the trench layer with respect to the reference refractive index region is Δ3. In addition, the outer diameter of the adjacent region, in other words, the inner diameter of the trench layer is 2b, and the outer diameter of the trench layer is 2c.

The optical fiber according to the second embodiment has a structure in which the trench layer is provided to the optical fiber 10 according to the first embodiment, and preferable ranges of the values of Δ1 and the core diameter are same as those of the optical fiber 10. Accordingly, similarly to the optical fiber 10, the optical fiber according to the second embodiment is a small-diameter optical fiber having a reduced leakage loss and can have a reduced macrobending loss (bending loss) because of the effect of the trench layer.

However, similarly to the optical fiber 10, in the optical fiber according to the second embodiment, the relative refractive-index difference Δ3 of the trench layer and the inner diameter 2b and the outer diameter 2c of the trench layer have preferable ranges to satisfy G.652 standard or satisfy G.657 standard, which requires a smaller macrobending loss. For example, b/a is preferably equal to or larger than two for the core diameter 2a, and b/a is preferably equal to or larger than three. In addition, the width of the trench layer, (c−b), is preferably 0.2 to 1 time larger than a, and Δ3 is preferably equal to or smaller than −0.4%. These will be described later.

Figure 5:
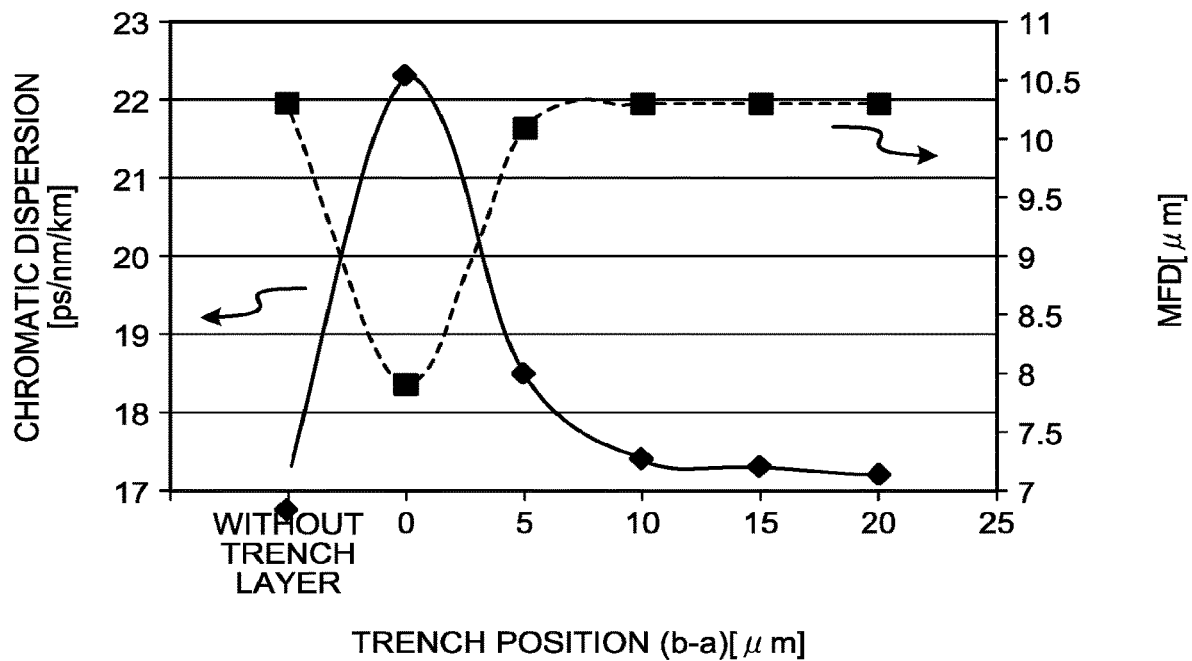
FIG. 5 is a diagram illustrating the relation of chromatic dispersion and MFD with the distance between a trench layer and a core portion.

FIG. 5 is a diagram illustrating results of simulation calculation of the relation of chromatic dispersion and the MFD with the distance between the trench layer and the core portion in an optical fiber including the trench layer as in the second embodiment. Here, the distance between the trench layer and the core portion is the distance (b−a) between the outer periphery of the core portion and the inner periphery of the trench layer, and is a value corresponding to the thickness of the adjacent region. Note that the core diameter 2a is 10 μm, Δ3 is −1%, and the width of the trench layer, (c−b), is 10 μm, which is equal to the core diameter 2a. Note that the distance between the trench layer and the core portion being 0 μm in FIG. 5 corresponds to a case in which the trench layer is adjacent to the core portion (in other words, the trench layer exists in the adjacent region). In addition, "no trench" corresponds to a case of the optical fiber 10 according to the first embodiment.

As illustrated in FIG. 5, it can be understood that change of the chromatic dispersion and the MFD from the case of no trench is large when the distance between the trench layer and the core portion is 0 μm (in other words, the core portion and the trench layer are adjacent to each other), but a stable state that has almost no change of the chromatic dispersion and the MFD is reached when the distance between the trench layer and the core portion is equal to or longer than 10 μm approximately, in other words, b/a is equal to or larger than three approximately. In addition, it can be said that change of the chromatic dispersion and the MFD becomes gradual when the distance between the trench layer and the core portion reaches 5 μm approximately, in other words, b/a reaches 2. Thus, to reduce characteristic change from the optical fiber 10 due to provision of the trench layer, the trench layer is preferably provided in the non-the adjacent region, b/a is preferably equal to or larger than two, more preferably equal to or larger than three, when Δ3 is large at −1% approximately.

Figure 6:
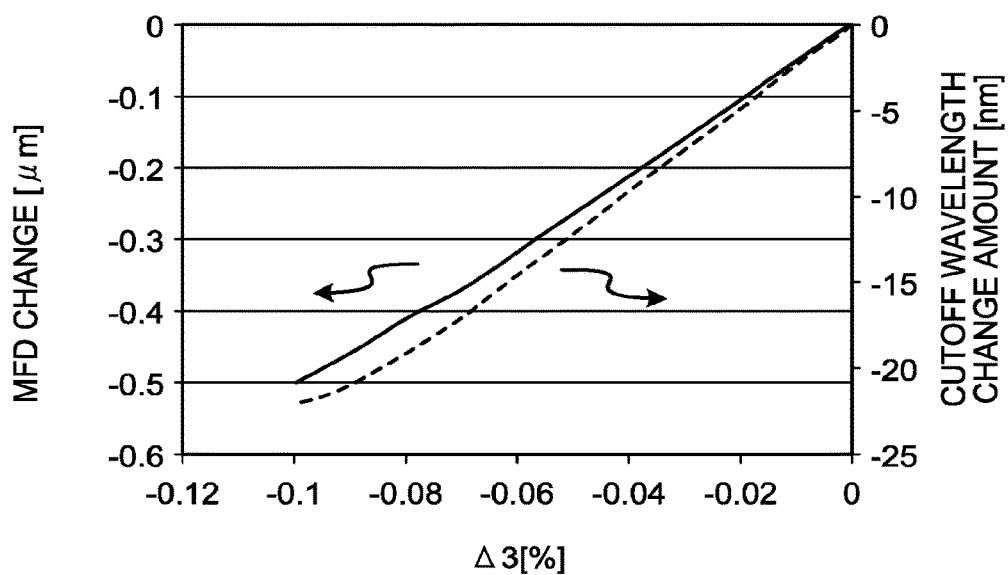
FIG. 6 is a diagram illustrating the relation of an MFD change amount and a cutoff wavelength change amount with Δ3 when the core portion and the trench layer are adjacent to each other.

However, the present disclosure is not limited thereto, but the core portion and the trench layer may be adjacent to each other as a modification of the second embodiment. FIG. 6 is a diagram illustrating results of simulation calculation of the relation of an MFD change amount (solid line) and a cutoff wavelength change amount (dashed line) with Δ3 when the core portion and the trench layer are adjacent to each other. The core diameter and Δ1 are same as those in the case of FIG. 5. In addition, the width of the trench layer, (c−b), is 4a. Note that these change amounts are calculated by changing the core diameter to three values so that the cutoff wavelength is 1160 nm to 1260 nm. It can be understood from FIG. 6 that the MFD change amount and the cutoff wavelength change amount are sufficiently small when the width of the trench layer, (c−b), is relatively large at 4a but Δ3 is equal to or larger than −0.1% approximately and smaller than 0%. Note that the change amounts can be smaller when the width of the trench layer, (c−b), is smaller than 4a, but in this case, Δ3 is preferably set to be equal to or larger than −0.1% and smaller than 0% in accordance with allowed change amounts of the MFD, the cutoff wavelength, and the like.

The optical fibers according to the first and second embodiments and the modification above can be configured to satisfy G.652 standard. In addition, when an optical fiber satisfying ITU-T G.654 standard (what is called a cutoff shift fiber, and for example, the cutoff wavelength is defined to be equal to or shorter than 1530 nm) or G.657 standard (what is called a bending resistance fiber), which require characteristics close to those of G.652 standard, is designed, it is favorable to employ the refractive index profile of the core portion of each optical fiber according to the first embodiment or 2 or the modification.

In addition, each optical fiber according to the first embodiment or 2 or the modification, which has a small diameter, has a small amount of a glass material of the cladding portion, and thus is an optical fiber, the material cost of which is reduced.

The present disclosure will be further described below. Each optical fiber according to the present disclosure is a small-diameter optical fiber having a reduced leakage loss but preferably satisfies G.652 standard as described above in practical use. Specifically, it is preferable to achieve a leakage loss equal to or smaller than 0.001 dB/km at a wavelength of 1625 nm and satisfy G.652A, G.652B, G.652C, G.652D standards listed in Table 1. Note that the macrobending loss has a value at a wavelength of 1550 nm in G.652A standard but has a value at a wavelength of 1625 nm in G.652B, G.652C, and G.652D standards. Note that, in this and following tables, "E" represents a power of 10, and for example, "5.3E−3" means "5.3×10$^{-3}$".

TABLE 1

| Zero-dispersion wavelength [nm] | Dispersion slope [ps/nm$^2$/km] @zero-dispersion wavelength | MFD [µm] @1310 nm | Cutoff wavelength [nm] @22 m | Macrobending loss [dB/m @60 mm] @1550 nm (1625 nm for B, C, D) |
|---|---|---|---|---|
| 1300-1324 | ≤0.092 | 8.6-9.5 | ≤1260 | ≤5.3E−3 |

Table 2 lists exemplary results of simulation calculation of characteristics of the optical fiber 10 according to the first embodiment in which Δ1 is set to be 0.32% to 0.40% and the core diameter 2a is set to be 7 µm to 10 µm. In any case, G.652A standard is satisfied and the threshold fiber diameter is smaller than 100 µm. In particular, it can be understood that the fiber diameter can be 80 µm when Δ1 is 0.37% and 2a is 9.0 µm. In other words, an optical fiber having Δ1 and a core diameter of these values has a fiber diameter smaller than 100 µm and has small influence of the leakage loss in a wavelength band equal to or longer than the cutoff wavelength and equal to or shorter than 1625 nm in which single mode operation is performed.

TABLE 2

| Δ1 [%] G.652 A standard | 2a [µm] | Zero-dispersion wavelength [nm] 1300-1324 | Dispersion slope [ps/nm$^2$/km] @zero-dispersion wavelength ≤0.092 | MFD [µm] @1310 nm 8.6-9.5 | Cutoff wavelength [nm] @22 m ≤1260 | Macrobending loss [dB/m @60 mm] @1550 nm ≤5.3E−3 | Threshold fiber diameter [µm] (<100) |
|---|---|---|---|---|---|---|---|
| 0.39 | 8.0 | 1319 | 0.085 | 8.6 | 1145 | 3.9E−6 | 84 |
| 0.38 | 8.0 | 1320 | 0.085 | 8.7 | 1130 | 1.6E−5 | 86 |
| 0.37 | 8.0 | 1321 | 0.085 | 8.7 | 1118 | 6.2E−5 | 89 |
| 0.37 | 8.5 | 1311 | 0.087 | 8.9 | 1185 | 5.1E−6 | 84 |
| 0.37 | 9.0 | 1304 | 0.090 | 9.1 | 1254 | 3.3E−7 | 80 |
| 0.36 | 8.0 | 1322 | 0.084 | 8.8 | 1100 | 2.4E−4 | 92 |
| 0.36 | 9.0 | 1305 | 0.090 | 9.2 | 1241 | 1.8E−6 | 83 |
| 0.35 | 8.0 | 1323 | 0.084 | 8.9 | 1085 | 9.3E−4 | 96 |
| 0.35 | 9.0 | 1305 | 0.090 | 9.3 | 1222 | 8.5E−6 | 85 |
| 0.34 | 9.0 | 1306 | 0.089 | 9.4 | 1204 | 3.2E−5 | 88 |
| 0.33 | 9.0 | 1307 | 0.089 | 9.4 | 1185 | 1.4E−4 | 91 |

Note that, in an actual optical fiber, because of additional factors such as the microbending loss, it is important to use parameters listed in Table 2 and further use a coating structure having optimum resin property and thickness to reduce the microbending loss.

Here, an optical fiber as an example of the present disclosure was manufactured by a publicly known method to investigate matching of the simulation results in Table 2 and characteristics of an actual optical fiber. In the optical fiber of the example, Δ1 was 0.37%, the core diameter was 8.5 µm, and the fiber diameter was 90 µm. Note that a resin material used in a normal optical fiber that satisfies G.650.2 standard was used as the resin material of the coating, but a primary layer and a secondary layer were thinner than normal with outer diameters of 100 µm and 125 µm, respectively.

Figure 7:
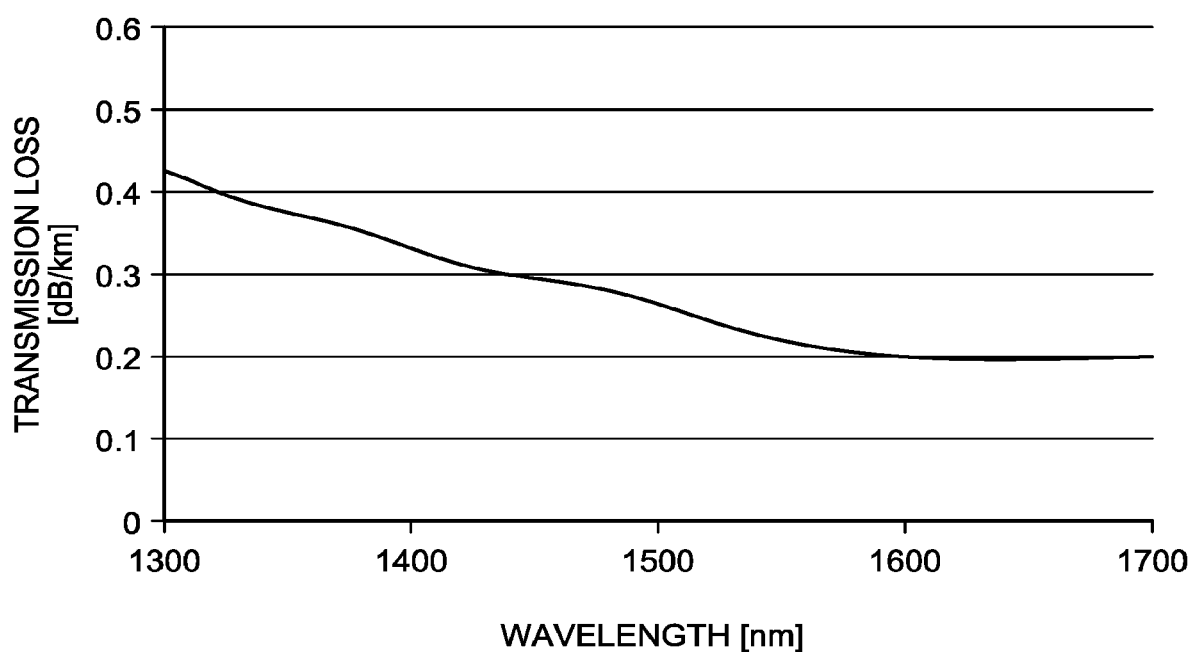
FIG. 7 is a diagram illustrating a measurement result of a transmission loss.

FIG. 7 is a diagram illustrating a measurement result of a transmission loss of the optical fiber of the example. As illustrated in FIG. 7, loss increase was not observed on the long-wavelength side in a transmission loss spectrum of the optical fiber of the example. This means that almost no leakage loss occurs in the optical fiber of the example. In addition, as listed in Table 3, a calculation example that is a simulation result and an actual value of the example match each other at high accuracy.

TABLE 3

| | Transmission loss [dB/km] | MFD [μm] @1550 nm | Cutoff wavelength Unit [nm] | Macrobending loss [dB/m @20 mm] @1550 nm |
|---|---|---|---|---|
| Calculation example | — | 10.0 | 1185 | 2.8 |
| Example | 0.228 | 10.0 | 1195 | 2.1 |

Subsequently, it will be described based on a simulation result that the diameter of the optical fiber according to the second embodiment can be further reduced. Hereinafter, simulation calculation is performed while Δ1 is fixed to 3.6% but the core diameter 2a, a trench position, a trench width, Δ3, and the like are changed. Here, the trench position is b/a. In addition, the trench width is a value normalized with the core diameter, in other words, the trench width is (c−b)/a.

First, simulation calculation was performed while the core diameter 2a was 9 μm, Δ3 was −0.4%, −0.6%, −0.7%, −1.0%, and the trench position and the trench width were changed.

Figure 8A:
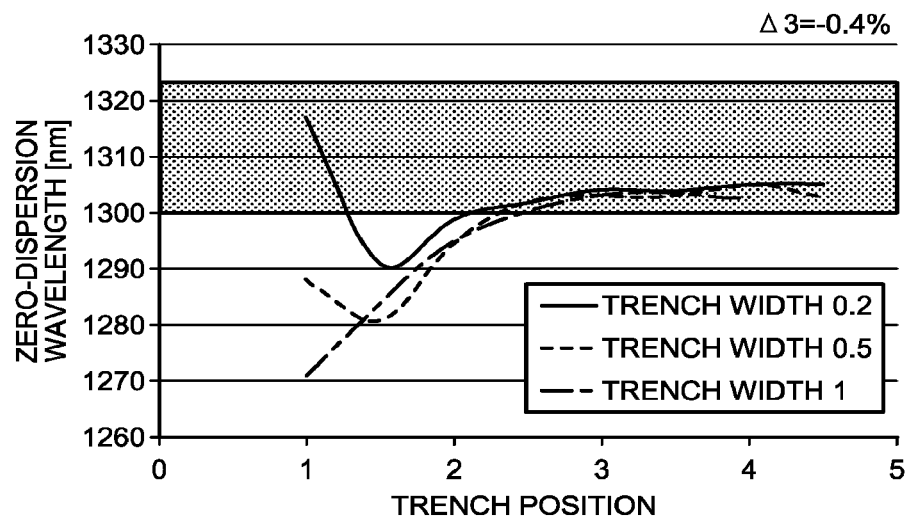
FIG. 8A is a diagram illustrating the relation of a zero-dispersion wavelength with a trench position.
Figure 8B:
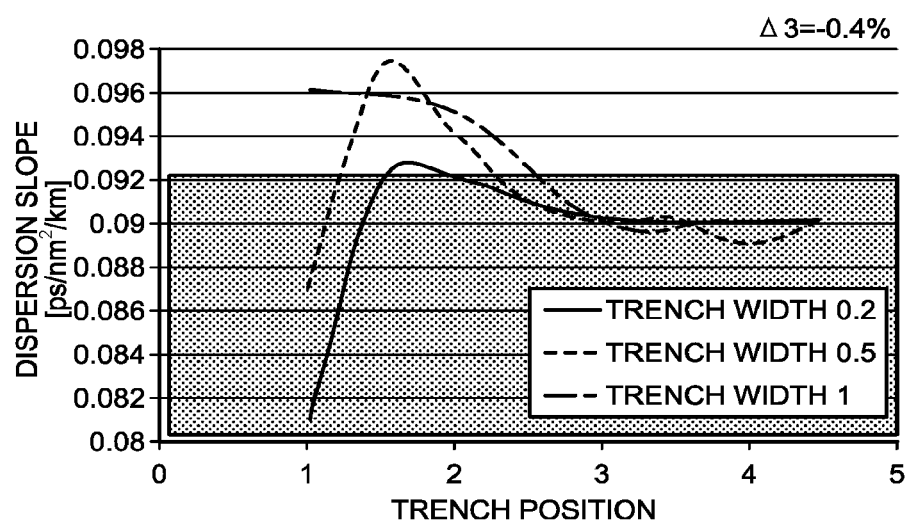
FIG. 8B is a diagram illustrating the relation of a dispersion slope with the trench position.
Figure 8C:
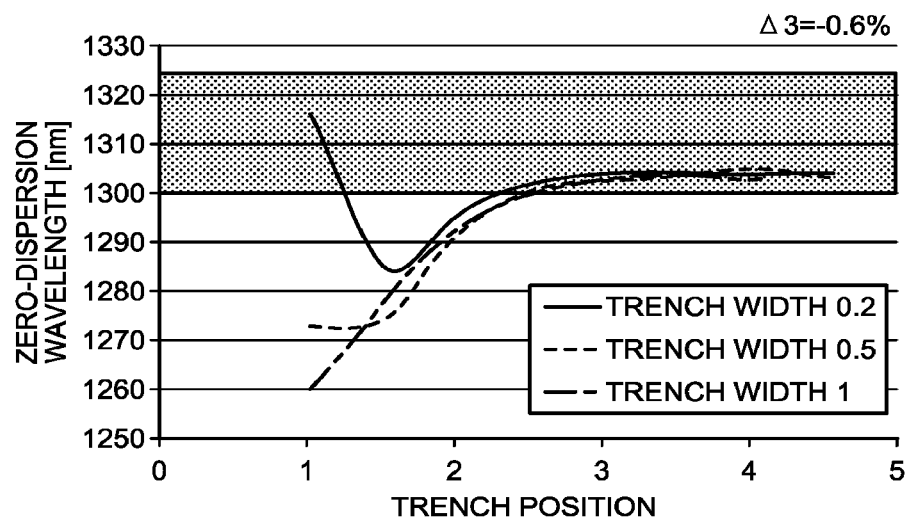
FIG. 8C is a diagram illustrating the relation of the zero-dispersion wavelength with the trench position.
Figure 8D:
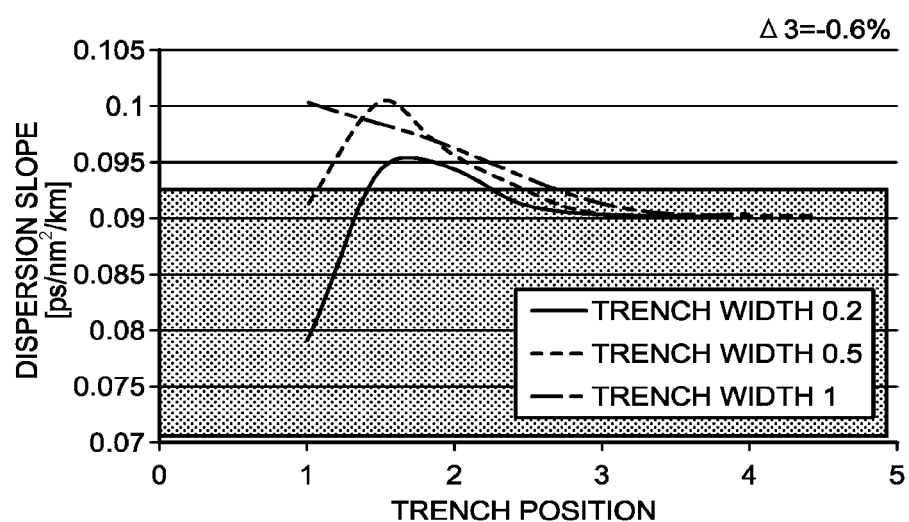
FIG. 8D is a diagram illustrating the relation of the dispersion slope with the trench position.
Figure 9A:
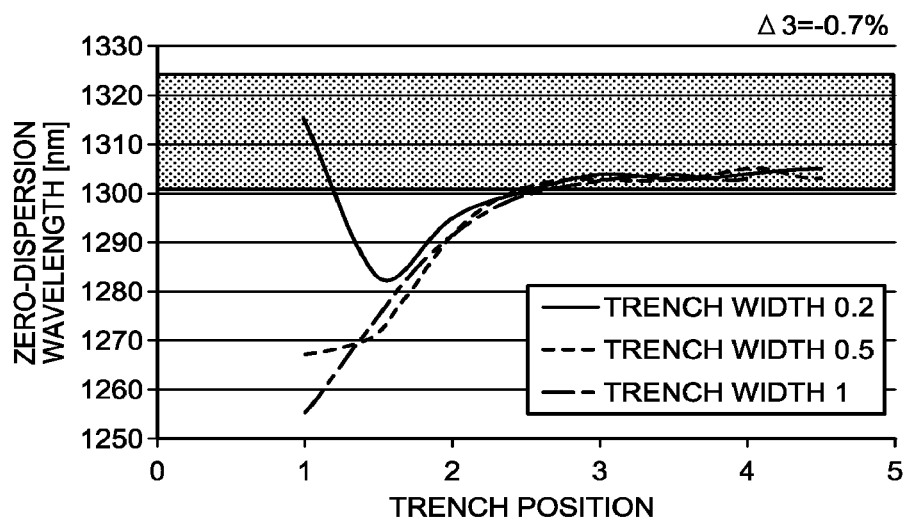
FIG. 9A is a diagram illustrating the relation of the zero-dispersion wavelength with the trench position.
Figure 9B:
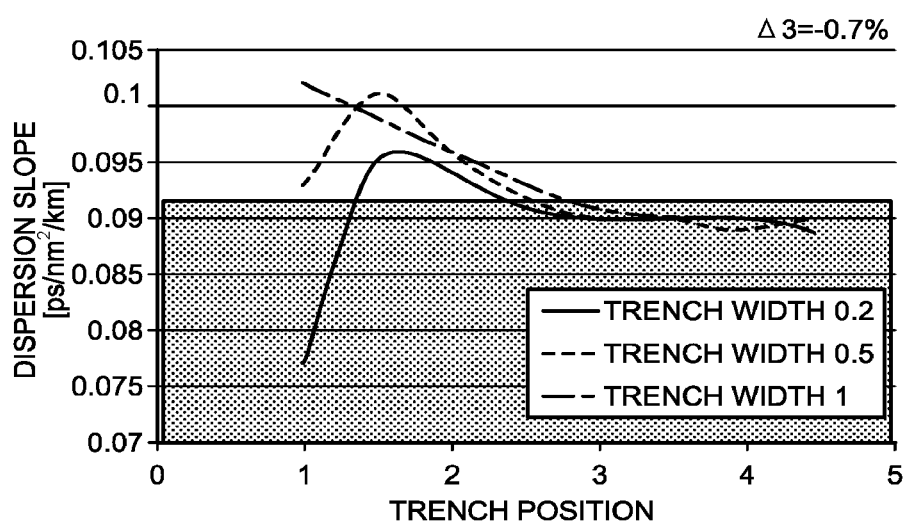
FIG. 9B is a diagram illustrating the relation of the dispersion slope with the trench position.
Figure 9C:
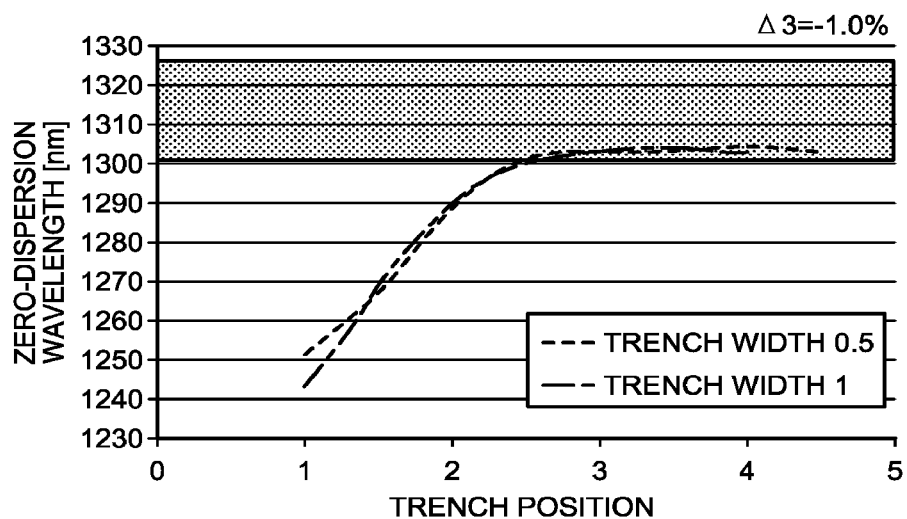
FIG. 9C is a diagram illustrating the relation of the zero-dispersion wavelength with the trench position.
Figure 9D:
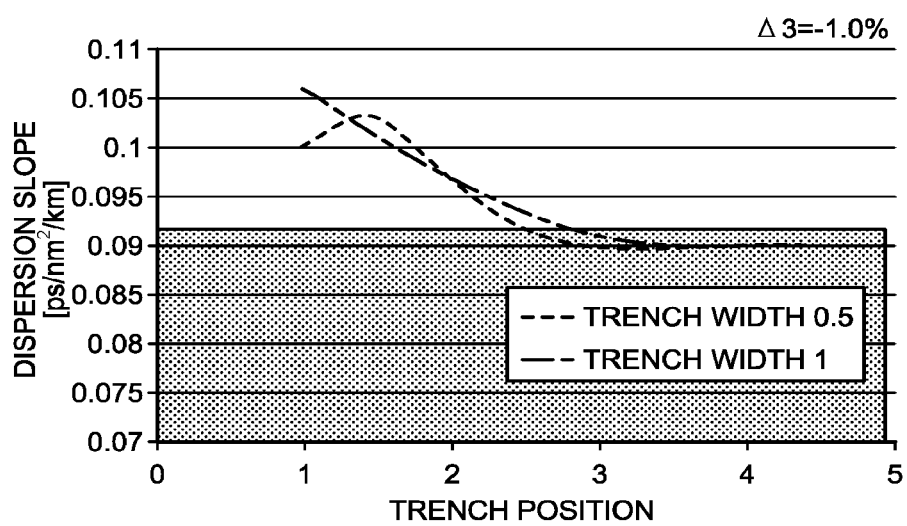
FIG. 9D is a diagram illustrating the relation of the dispersion slope with the trench position.

FIGS. 8A to 8D and 9A to 9D are diagrams illustrating the relation of dispersion characteristics, in other words, the zero-dispersion wavelength and the dispersion slope with the trench position. The dispersion slope has a value at the zero-dispersion wavelength. FIGS. 8A and 8B correspond to a case in which Δ3 is −0.4%, and FIGS. 8C and 8D correspond to a case in which Δ3 is −0.6%. In addition, FIGS. 9A and 9B correspond to a case in which Δ3 is −0.7%, and FIGS. 9C and 9D correspond to a case in which Δ3 is −1.0%.

Figure 10A:
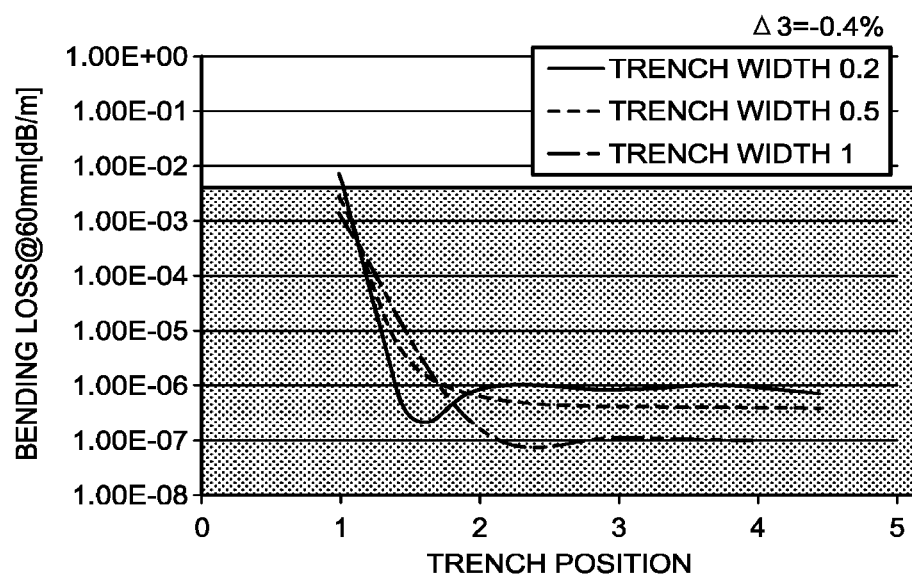
FIG. 10A is a diagram illustrating the relation of a bending loss with the trench position.
Figure 10B:
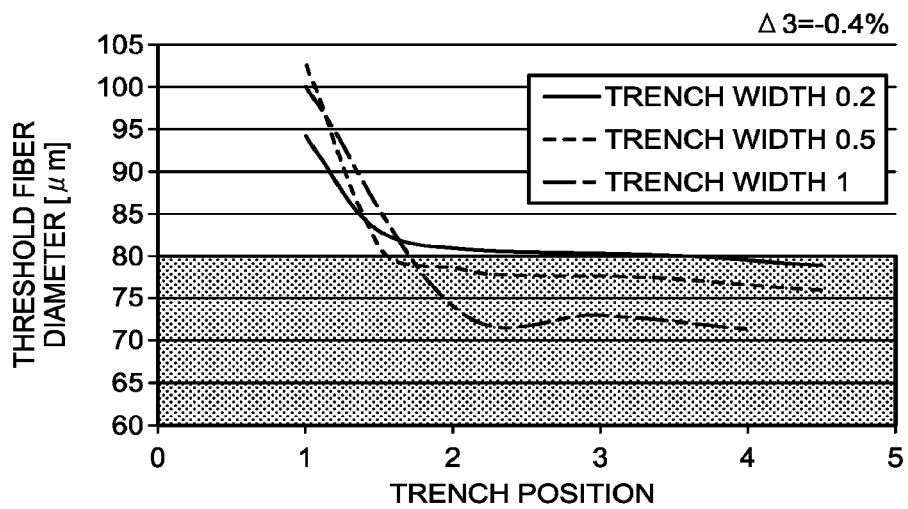
FIG. 10B is a diagram illustrating the relation of a threshold fiber with the trench position.
Figure 10C:
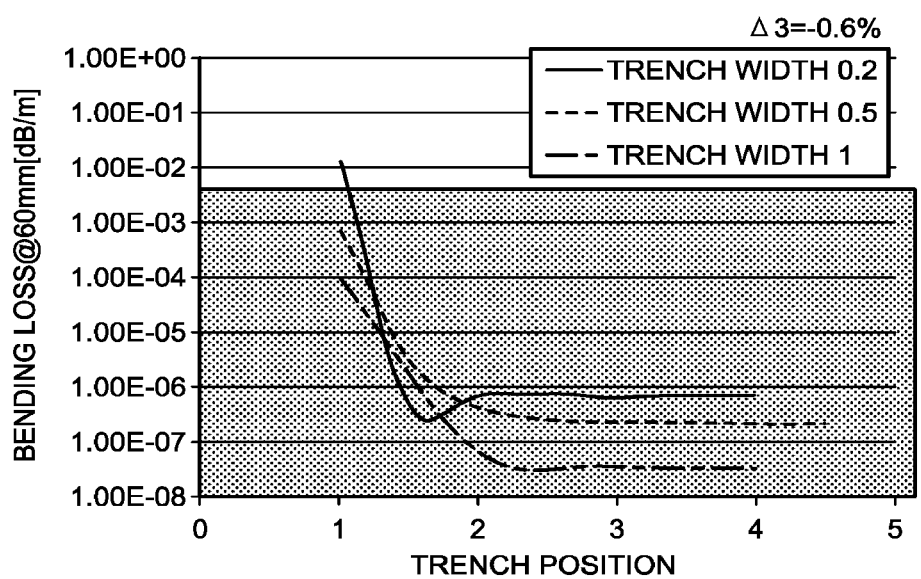
FIG. 10C is a diagram illustrating the relation of the bending loss with the trench position.
Figure 10D:
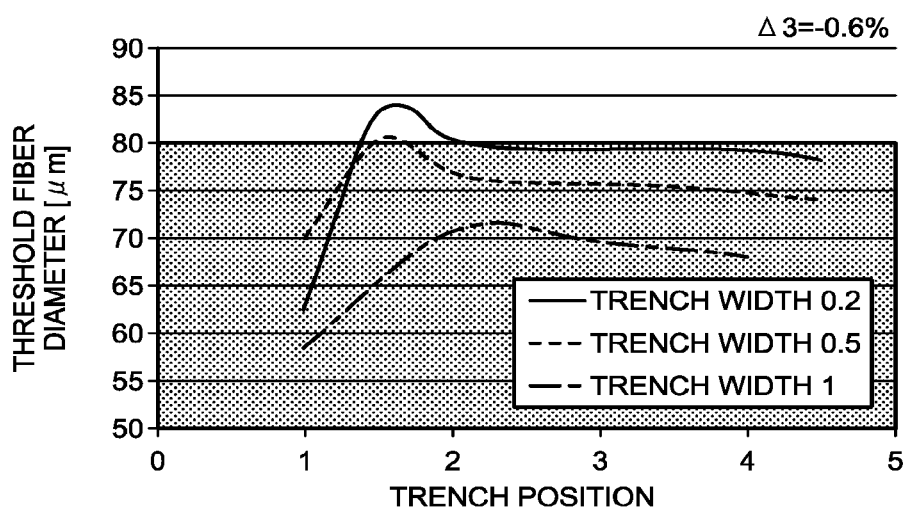
FIG. 10D is a diagram illustrating the relation of the threshold fiber with the trench position.
Figure 11A:
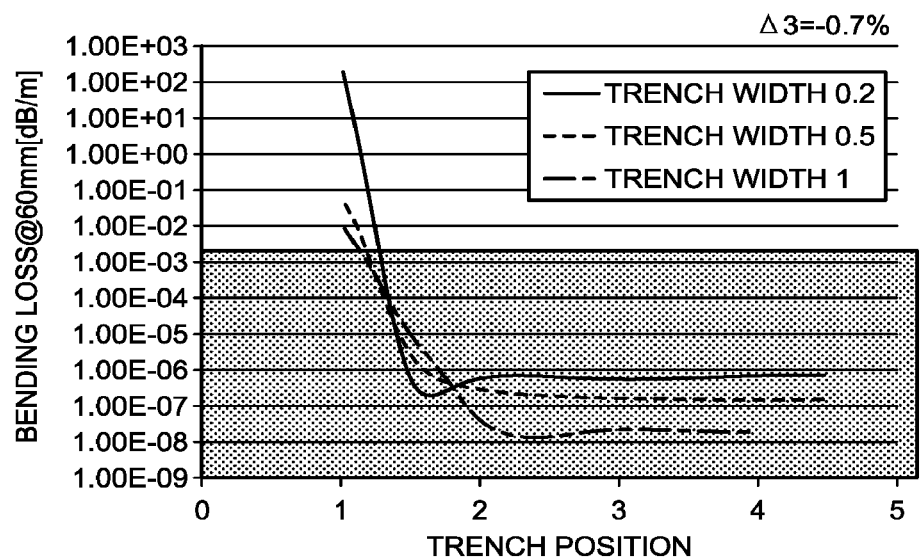
FIG. 11A is a diagram illustrating the relation of the bending loss with the trench position.
Figure 11B:
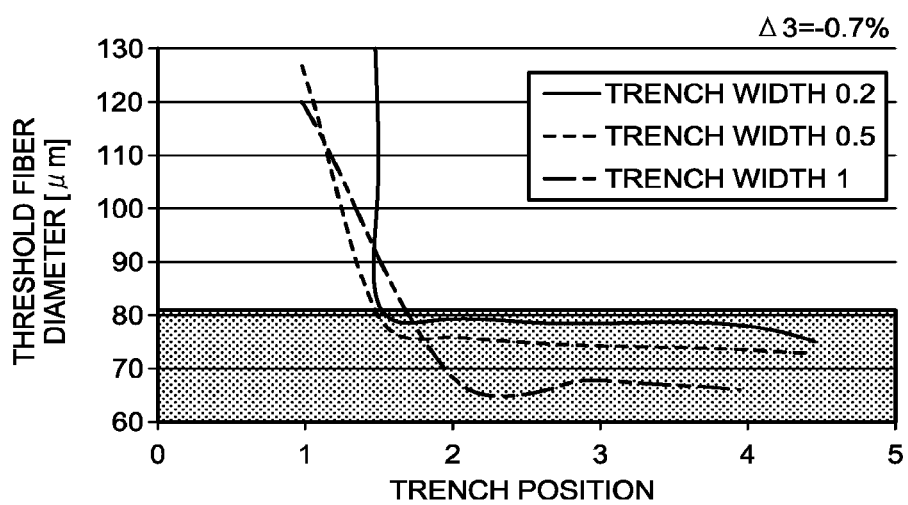
FIG. 11B is a diagram illustrating the relation of the threshold fiber with the trench position.
Figure 11C:
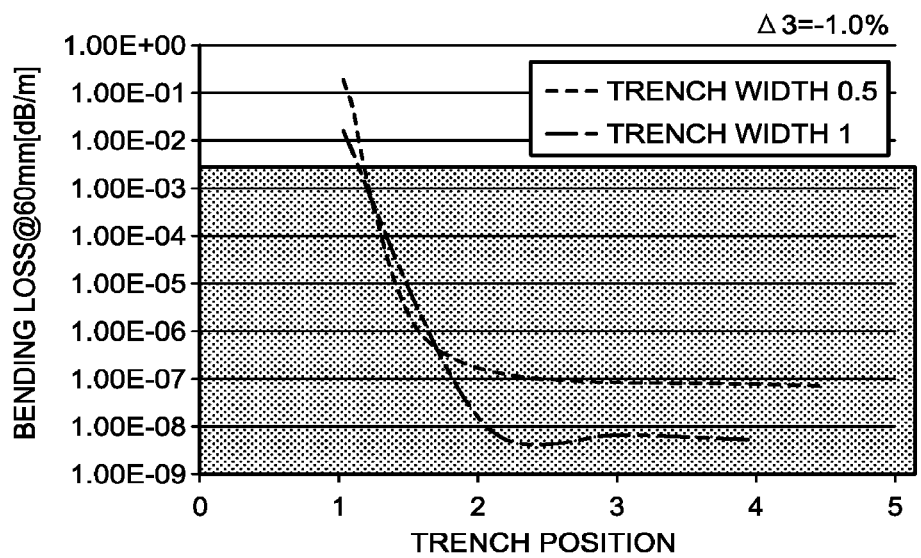
FIG. 11C is a diagram illustrating the relation of the bending loss with the trench position.
Figure 11D:
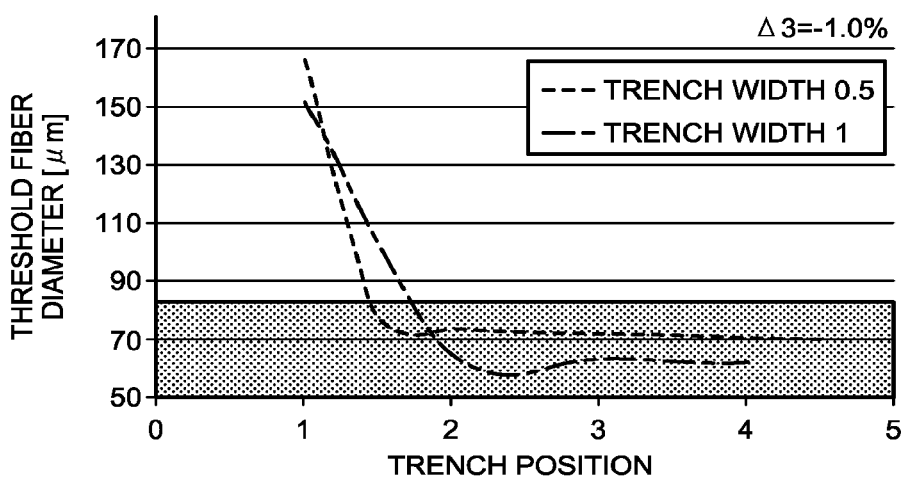
FIG. 11D is a diagram illustrating the relation of the threshold fiber with the trench position.
Figure 12A:
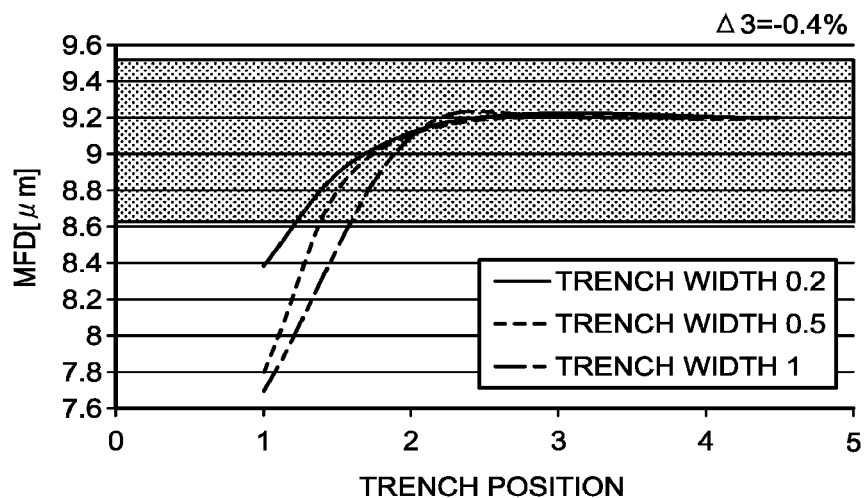
FIG. 12A is a diagram illustrating the relation of the MFD with the trench position.
Figure 12B:
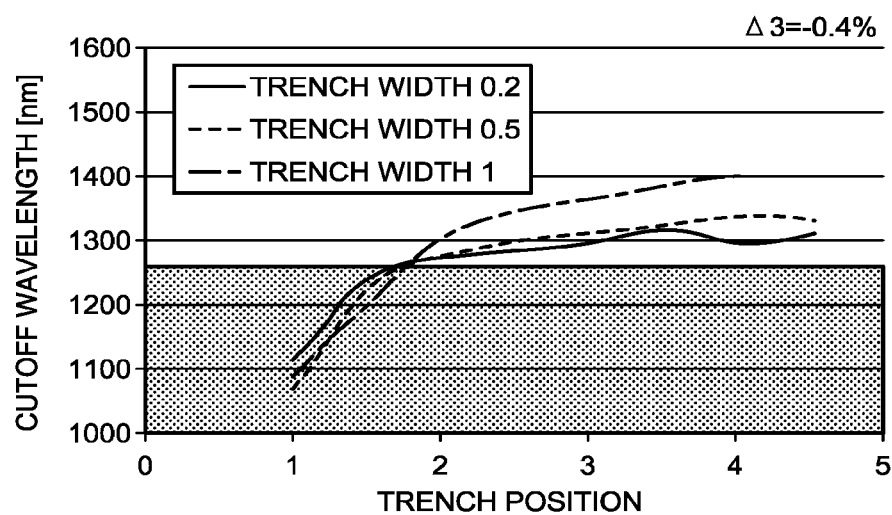
FIG. 12B is a diagram illustrating the relation of a cutoff wavelength with the trench position.
Figure 12C:
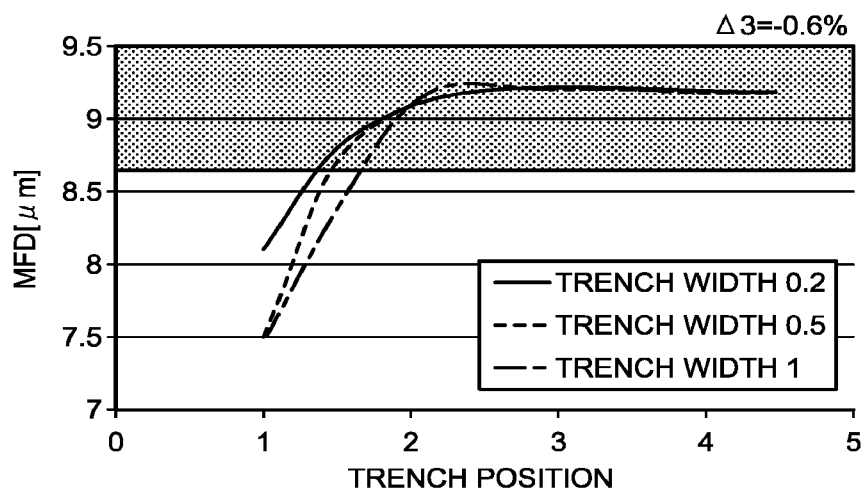
FIG. 12C is a diagram illustrating the relation of the MFD with the trench position.
Figure 12D:
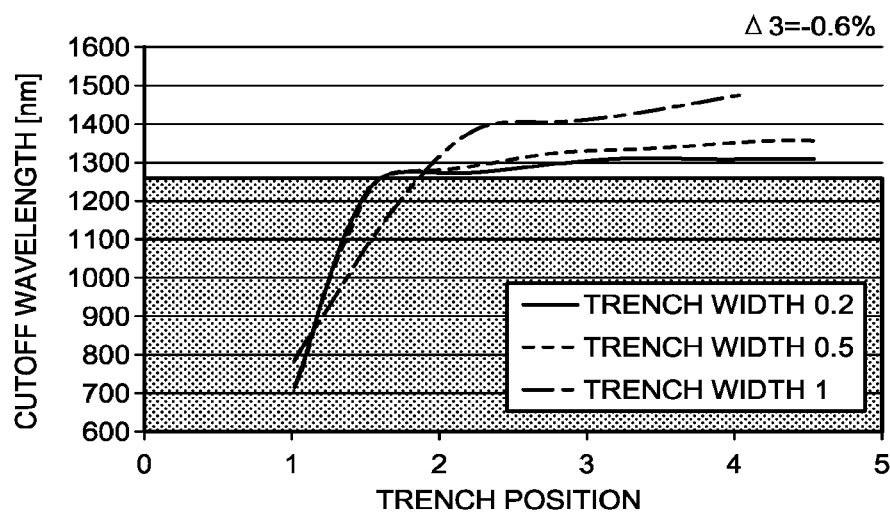
FIG. 12D is a diagram illustrating the relation of the cutoff wavelength with the trench position.
Figure 13A:
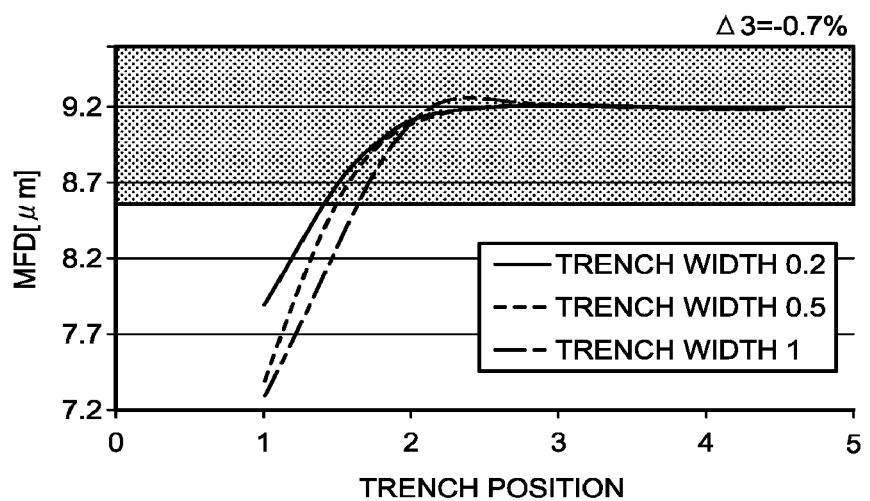
FIG. 13A is a diagram illustrating the relation of the MFD with the trench position.
Figure 13B:
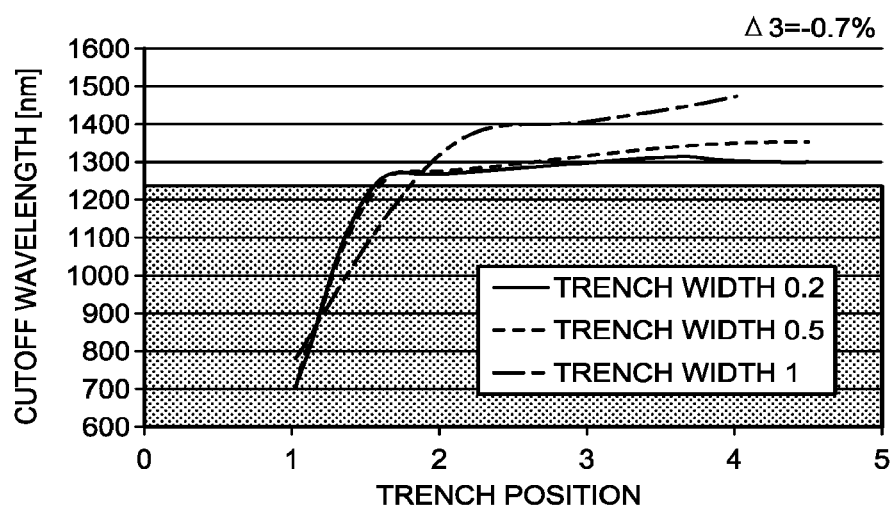
FIG. 13B is a diagram illustrating the relation of the cutoff wavelength with the trench position.
Figure 13C:
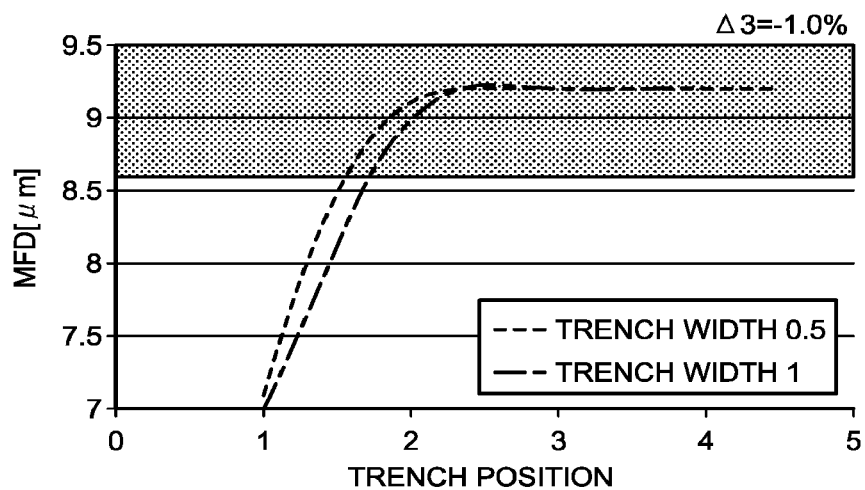
FIG. 13C is a diagram illustrating the relation of the MFD with the trench position.
Figure 13D:
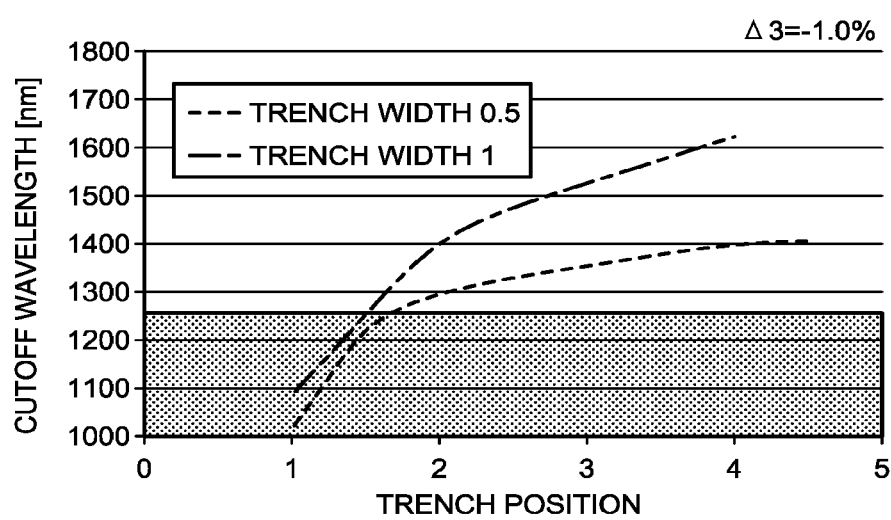
FIG. 13D is a diagram illustrating the relation of the cutoff wavelength with the trench position.

FIGS. 10A to 10D and 11A to 11D are diagrams illustrating the relation of optical confinement characteristics, in other words, the bending loss (macrobending loss) and the threshold fiber diameter with the trench position. The bending loss has a value at a wavelength of 1550 nm when bending is made at a diameter of 60 mm. FIGS. 10A and 10B correspond to a case in which Δ3 is −0.4%, and FIGS. 10C and 10D correspond to a case in which Δ3 is −0.6%. In addition, FIGS. 11A and 11B correspond to a case in which Δ3 is −0.7%, and FIGS. 11C and 11D correspond to a case in which Δ3 is −1.0%.

FIGS. 12 and 13 are diagrams illustrating the relation of the MFD and the cutoff wavelength with the trench position. The MFD has a value at a wavelength of 1310 nm. FIGS. 12A and 12B correspond to a case in which Δ3 is −0.4%, and FIGS. 12C and 12D correspond to a case in which Δ3 is −0.6%. In addition, FIGS. 13A and 13B correspond to a case in which Δ3 is −0.7%, and FIGS. 13C and 13D correspond to a case in which Δ3 is −1.0%.

In FIGS. 8A to 13D, a range surrounded by bold lines indicates a target value for the threshold fiber diameter in FIGS. 10B, 10D, 11B, and 11D and indicates the range of G.652A standard for the others. Note that the target value is set to be 80 μm or smaller in this example but may be a small diameter smaller than 100 μm.

As it is clear from FIGS. 8A to 8D and 9A to 9D, the dispersion characteristic largely changes when the trench position is small, in other words, the trench layer is close to the core portion, but as the trench position increases, change of the dispersion characteristic becomes gradual and becomes stable within the standard. In addition, as it is clear from FIGS. 10A to 10D and 11A to 11D, similarly to the dispersion characteristic, when the trench position is small, change of the optical confinement characteristic is large but is irregular. In addition, as the trench position increases, change of the optical confinement characteristic becomes gradual, the bending loss becomes within the standard, and the threshold fiber diameter becomes 80 μm or smaller.

As it is clear from FIGS. 12A to 12D and 13A to 13D, as the trench position increases, the MFD increases and satisfies the standard, and thereafter has a stable value. However, the cutoff wavelength has a trade-off relation with the MFD, and as the trench position increases, the cutoff wavelength increases and does not satisfy the standard. Thus, it is preferable to set the trench position so that the MFD and the cutoff wavelength both satisfy the standard.

Subsequently, simulation calculation was performed while the core diameter 2a was 8 μm and the trench position and the trench width were changed. Note that Δ3 was −0.4% and −0.6%, but since it was found that Δ3 at small values of −0.7% and −1.0% does not much affect optical properties defined by the standard, calculation was omitted in the following with consideration on manufacturing easiness of the optical fiber.

Table 4 indicates a case in which Δ3 is −0.4%. Table 5 indicates a case in which Δ3 is −0.6%. Note that a symbol "○" is provided when G.652A standard is satisfied, and a symbol "x" is provided when the standard not satisfied. As indicated in Tables 4 and 5, there were a large number of combinations of parameters with which G.652A standard was satisfied and the threshold fiber diameter was smaller than 100 μm. In particular, there was a combination with which the threshold fiber diameter was 80 μm or smaller when Δ3 was −0.6%. For example, the threshold fiber diameter was 78 μm when the trench width was 1.0 and the trench position was 3.0.

In this manner, it is preferable that (c−b)/a is 0.2 to 1, in other words, (c−b) is 0.2 to 1 time larger than a when b/a is two or larger for the trench position. In addition, it is preferable that Δ2 is equal to or smaller than −0.4%.

TABLE 4

| Δ1 = 0.36%, 2a = 8 μm, Δ3 = −0.4% | | | | | | | |
|---|---|---|---|---|---|---|---|
| Trench width | Trench position | Threshold fiber diameter [μm] | Zero-dispersion wavelength | Dispersion slope | MFD | Cutoff wavelength | Macrobending loss |
| 0.2 | 1 | >125 | x | ○ | x | ○ | x |
| | 1.5 | 98 | x | ○ | x | ○ | ○ |
| | 2 | 92 | ○ | ○ | ○ | ○ | ○ |
| | 2.5 | 90 | ○ | ○ | ○ | ○ | ○ |
| | 3 | 89 | ○ | ○ | ○ | ○ | ○ |
| | 3.5 | 89 | ○ | ○ | ○ | ○ | ○ |

TABLE 4-continued $\Delta 1 = 0.36\%$, $2a = 8$ μm, $\Delta 3 = -0.4\%$

| Trench width | Trench position | Threshold fiber diameter [μm] | Zero-dispersion wavelength | Dispersion slope | MFD | Cutoff wavelength | Macrobending loss |
|---|---|---|---|---|---|---|---|
| | 4 | 89 | ○ | ○ | ○ | ○ | ○ |
| | 4.5 | 88 | ○ | ○ | ○ | ○ | ○ |
| 0.5 | 1 | >125 | ○ | ○ | × | ○ | × |
| | 1.5 | 97 | × | × | × | ○ | ○ |
| | 2 | 90 | ○ | ○ | ○ | ○ | ○ |
| | 2.5 | 88 | ○ | ○ | ○ | ○ | ○ |
| | 3 | 87 | ○ | ○ | ○ | ○ | ○ |
| | 3.5 | 87 | ○ | ○ | ○ | ○ | ○ |
| | 4 | 87 | ○ | ○ | ○ | ○ | ○ |
| | 4.5 | 86 | ○ | ○ | ○ | ○ | ○ |
| 1.0 | 1 | >125 | × | ○ | × | ○ | × |
| | 2 | 85 | ○ | × | ○ | ○ | ○ |
| | 3 | 82 | ○ | ○ | ○ | ○ | ○ |
| | 4 | 81 | ○ | ○ | ○ | ○ | ○ |

TABLE 5

$\Delta 1 = 0.36\%$, $2a = 8$ μm, $\Delta 3 = -0.6\%$

| Trench width | Trench position | Threshold fiber diameter [μm] | Zero-dispersion wavelength | Dispersion slope | MFD | Cutoff wavelength | Macrobending loss |
|---|---|---|---|---|---|---|---|
| 0.2 | 1 | >125 | × | ○ | × | ○ | ○ |
| | 1.5 | 98 | × | ○ | × | ○ | ○ |
| | 2 | 92 | ○ | ○ | ○ | ○ | ○ |
| | 2.5 | 90 | ○ | ○ | ○ | ○ | ○ |
| | 3 | 89 | ○ | ○ | ○ | ○ | ○ |
| | 3.5 | 89 | ○ | ○ | ○ | ○ | ○ |
| | 4 | 89 | ○ | ○ | ○ | ○ | ○ |
| | 4.5 | 88 | ○ | ○ | ○ | ○ | ○ |
| 0.5 | 1 | >125 | ○ | ○ | × | ○ | × |
| | 1.5 | 99 | × | × | × | ○ | ○ |
| | 2 | 88 | × | × | ○ | ○ | ○ |
| | 2.5 | 86 | ○ | ○ | ○ | ○ | ○ |
| | 3 | 85 | ○ | ○ | ○ | ○ | ○ |
| | 3.5 | 85 | ○ | ○ | ○ | ○ | ○ |
| | 4 | 84 | ○ | ○ | ○ | ○ | ○ |
| | 4.5 | 83 | ○ | ○ | ○ | ○ | ○ |
| 1.0 | 1 | >125 | × | × | × | ○ | ○ |
| | 2 | 82 | × | × | ○ | ○ | ○ |
| | 3 | 78 | ○ | ○ | ○ | ○ | ○ |
| | 4 | 77 | ○ | ○ | ○ | × | ○ |

Figure 14:
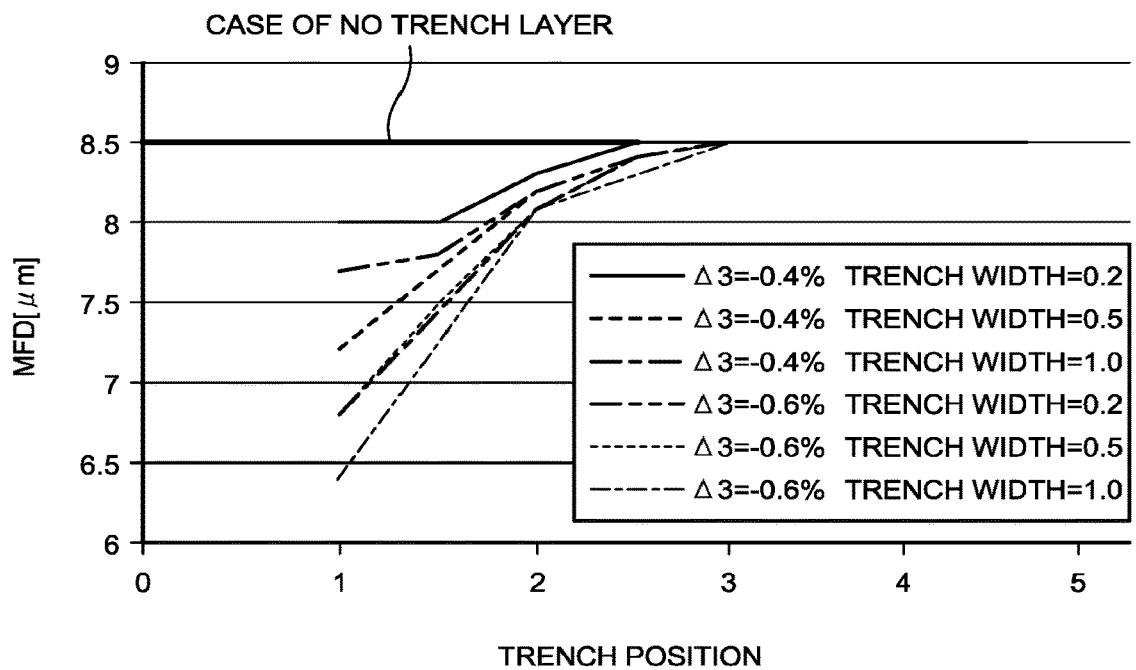
FIG. 14 is a diagram illustrating the relation of the MFD with the trench position.

Subsequently, simulation calculation was performed while the core diameter $2a$ was 7 μm, and the trench position and the trench width were changed. FIG. 14 and Table 6 indicate the relation of the MFD with the trench position. In comparison with the MFD in the case of no trench, it was found that the MFD is small when the trench position is small, and the MFD increases as the trench position increases but does not become larger than the MFD in the case of no trench.

TABLE 6

| $\Delta 3$ [%] | Trench width | Trench position | MFD [μm] |
|---|---|---|---|
| 0 (None) | 0 | 0 | 8.5 |
| −0.40 | 0.2 | 1 | 8 |
| | | 1.5 | 8 |
| | | 2 | 8.3 |

TABLE 6-continued

| $\Delta 3$ [%] | Trench width | Trench position | MFD [μm] |
|---|---|---|---|
| | | 2.5 | 8.5 |
| | | 3 | 8.5 |
| | | 3.5 | 8.5 |
| | | 4 | 8.5 |
| | | 4.5 | 8.5 |
| | 0.5 | 1 | 7.2 |
| | | 1.5 | 7.7 |
| | | 2 | 8.2 |
| | | 2.5 | 8.4 |
| | | 3 | 8.5 |
| | | 3.5 | 8.5 |
| | | 4 | 8.5 |
| | | 4.5 | 8.5 |
| | 1 | 1 | 6.8 |
| | | 2 | 8.1 |
| | | 3 | 8.5 |

TABLE 6-continued

| Δ3 [%] | Trench width | Trench position | MFD [μm] |
|---|---|---|---|
| −0.60 | 0.2 | 4 | 8.5 |
|  |  | 1 | 7.7 |
|  |  | 1.5 | 7.8 |
|  |  | 2 | 8.2 |
|  |  | 2.5 | 8.4 |
|  |  | 3 | 8.5 |
|  |  | 3.5 | 8.5 |
|  |  | 4 | 8.5 |
|  |  | 4.5 | 8.5 |
|  | 0.5 | 1 | 6.8 |
|  |  | 1.5 | 7.5 |
|  |  | 2 | 8.1 |
|  |  | 2.5 | 8.4 |
|  |  | 3 | 8.5 |
|  |  | 3.5 | 8.5 |
|  |  | 4 | 8.5 |
|  |  | 4.5 | 8.5 |
|  | 1 | 1 | 6.4 |
|  |  | 2 | 8.1 |
|  |  | 3 | 8.5 |
|  |  | 4 | 8.5 |

In the range of the above simulation results, it was checked that the core diameter $2a$ of 8 μm is optimum in a case of the optical fiber according to the second embodiment including the trench layer.

Note that, in the case of the optical fiber according to the second embodiment, the bending loss (macrobending loss) can be reduced because of the effect of the trench layer, which is favorable for application to an optical fiber that satisfies G.657 standard, which requires a smaller macrobending loss. In addition, the cutoff wavelength is allowed to shift to a longer wavelength, which is favorable for application to an optical fiber that satisfies G.654 standard.

Subsequently, a parameter combination having a most favorable characteristic among the step-type parameter combinations listed in Table 2 and a parameter combination having a most favorable characteristic among the trench-type parameter combinations listed in Table 5 are listed as optimum parameter combinations in Table 7. In addition, Table 8 lists G.652A standard and optical properties of an optical fiber in the case of Table 7. For the step type, 80 μm was obtained as the threshold fiber diameter through optimization of the refractive index profile of the core portion. In addition, for the trench type, 78 μm was obtained as the threshold fiber diameter because of the effect of the trench layer.

TABLE 7

| Item | Δ1 [%] | Δ3 [%] | b/a | c/a | 2a [μm] |
|---|---|---|---|---|---|
| Step type | 0.37 | — | — | — | 9.0 |
| Trench type | 0.36 | −0.60 | 3 | 4 | 8.0 |

TABLE 8

| Item Unit G.652 A Standard | Zero-dispersion wavelength [nm] 1300-1324 | Dispersion slope [ps/nm²/km] @zero-dispersion wavelength ≤0.092 | MFD [μm] @1310 nm 8.6-9.5 | Cutoff wavelength [nm] @22 m ≤1260 | Macrobending loss [dB/m @60 mm] @1550 nm ≤5.3E−3 | Threshold fiber diameter [μm] (<100) |
|---|---|---|---|---|---|---|
| Step type | 1304 | 0.090 | 9.1 | 1254 | 3.3E−7 | 80 |
| Trench type | 1317 | 0.088 | 8.8 | 1252 | 6.1E−6 | 78 |

Subsequently, Table 9 lists G.657A2 standard and the optical properties of an optical fiber in the case of Table 7. In the case of G.657A standard, the macrobending loss is defined to be a value at a wavelength of 1550 nm when bending is made at a diameter of 20 mm, which means a standard having more rigorous requirements than those of G.652. As understood from Table 9, G.657A2 standard was satisfied in the case of the trench-type, and superiority of the trench type was confirmed.

TABLE 9

| Item Unit G.657 A2 Standard | Zero-dispersion wavelength [nm] 1300-1324 | Dispersion slope [ps/nm²/km] @zero-dispersion wavelength ≤0.092 | MFD [μm] @1310 nm 8.6-9.2 | Cutoff wavelength [nm] @22 m ≤1260 | Macrobending loss [dB/m @20 mm] @1550 nm ≤1.59 | Threshold fiber diameter [μm] (<100) |
|---|---|---|---|---|---|---|
| Step type | 1304 | 0.090 | 9.1 | 1254 | 6.82 | 80 |
| Trench type | 1317 | 0.088 | 8.8 | 1252 | 0.26 | 78 |

Subsequently, how the optical properties of an optical fiber are changed when the optimum trench-type parameters listed in Table 5 are changed will be described below. Table 10 lists parameter combinations of Trenches 2 to 15 in which Δ1, Δ3, b/a, c/a, and 2a are changed with the optimum trench-type parameters listed in Table 5 as reference values (Trench 1). Note that, in the table, a symbol "-" indicates a value same as a reference value. Table 11 lists optical properties of optical fibers having parameters of G.652A standard and Trenches 1 to 15.

TABLE 10

| | | Item | | |
|---|---|---|---|---|
| Δ1 | Δ3 | b/a | c/a | 2a |
| [%] | [%] | Unit | | [μm] |
| Trench 1 (reference) | 0.36 | −0.60 | 3 | 4 | 8.0 |
| Trench 2 | 0.35 | — | — | — | — |
| Trench 3 | 0.37 | — | — | — | — |
| Trench 4 | — | −0.55 | — | — | — |
| Trench 5 | — | −0.63 | — | — | — |
| Trench 6 | — | −0.65 | — | — | — |
| Trench 7 | — | — | 2.8 | — | — |
| Trench 8 | — | — | 2.9 | — | — |
| Trench 9 | — | — | 3.2 | — | — |
| Trench 10 | — | — | — | 3.8 | — |
| Trench 11 | — | — | — | 4.05 | — |
| Trench 12 | — | — | — | 4.2 | — |
| Trench 13 | — | — | — | — | 7.8 |
| Trench 14 | — | — | — | — | 8.1 |
| Trench 15 | — | — | — | — | 8.2 |

TABLE 11

| Item Unit | Zero-dispersion wavelength [nm] | Dispersion slope [ps/nm²/km] @zero-dispersion wavelength | MFD [μm] @1310 nm | Cutoff wavelength [nm] @22 m | Macrobending loss [dB/m @60 mm] @1550 nm | Threshold fiber diameter [μm] |
|---|---|---|---|---|---|---|
| G.652 A Standard | 1300-1324 | ≤0.092 | 8.6-9.5 | ≤1260 | ≤5.3E-3 | (<100) |
| Trench 1 | 1317 | 0.088 | 8.8 | 1252 | 6.1E-6 | 78 |
| Trench 2 | 1317 | 0.088 | 8.9 | 1239 | 2.1E-5 | 81 |
| Trench 3 | 1316 | 0.087 | 8.8 | 1260 | 1.7E-6 | 76 |
| Trench 4 | 1316 | 0.087 | 8.7 | 1243 | 7.6E-6 | 79 |
| Trench 5 | 1317 | 0.087 | 8.8 | 1260 | 5.3E-6 | 78 |
| Trench 6 | 1317 | 0.088 | 8.8 | 1264 | 4.9E-6 | 77 |
| Trench 7 | 1315 | 0.089 | 8.8 | 1287 | 3.3E-6 | 76 |
| Trench 8 | 1316 | 0.088 | 8.8 | 1269 | 4.5E-6 | 77 |
| Trench 9 | 1318 | 0.087 | 8.8 | 1226 | 1.1E-5 | 81 |
| Trench 10 | 1319 | 0.087 | 8.8 | 1217 | 1.2E-5 | 81 |
| Trench 11 | 1318 | 0.087 | 8.8 | 1264 | 5.1E-6 | 77 |
| Trench 12 | 1319 | 0.087 | 8.8 | 1300 | 3.1E-6 | 75 |
| Trench 13 | 1320 | 0.087 | 8.8 | 1221 | 1.8E-5 | 81 |
| Trench 14 | 1315 | 0.088 | 8.9 | 1268 | 3.6E-6 | 77 |
| Trench 15 | 1314 | 0.088 | 8.9 | 1284 | 2.1E-6 | 76 |

Figure 15:
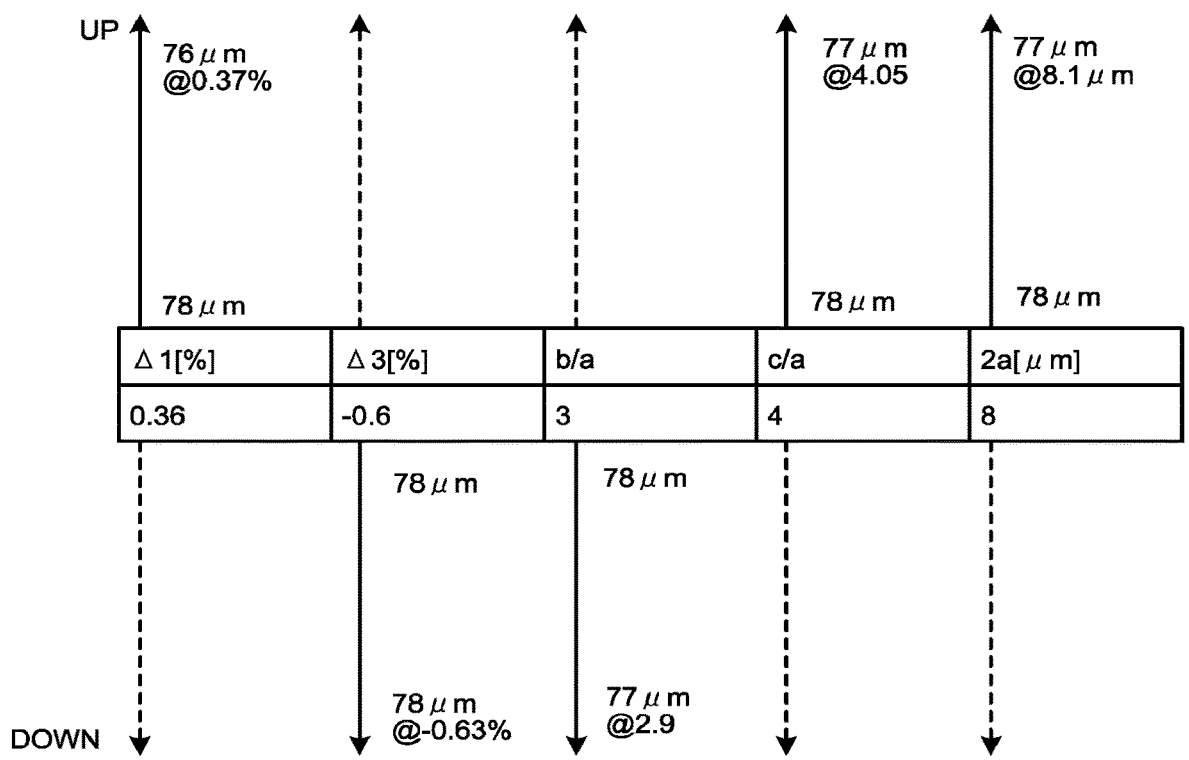
FIG. 15 is a diagram illustrating change of the threshold fiber diameter when parameters are changed.

FIG. 15 is a diagram illustrating change of the threshold fiber diameter when parameters are changed. As it is clear from the results of Tables 10 and 11, it can be understood that the threshold fiber diameter can be further reduced beyond 78 μm by, for example, changing parameters in the directions of change as indicated for Trenches 3, 5, 8, 11, and 14 (the directions of increase (UP) and decrease (DOWN) illustrated with solid line arrows in FIG. 15) but the cutoff wavelength shifts to the long-wavelength side. Trenches 3, 5, 8, 11, and 14 correspond to characteristics when the cutoff wavelength is near 1260 nm, which is a standard upper limit, but it can be understood that there is hardly room for improvement since the cutoff wavelength of Trench 1 as a reference is 1252 nm, which is close to the standard upper limit. In addition, as illustrated in FIG. 15, largest improvement was observed for the threshold fiber diameter when Δ1 was increased. It can be understood from this result as well that it is important to have an optimum structure for the core portion. For example, such characteristic improvement due to application of the trench type that G.652A standard satisfied and the threshold fiber diameter is 76 μm was achieved with Trench 3. Note that, in a case in which the present reference was used, the cutoff wavelength was a restriction factor of characteristic improvement when any parameter was changed, but it is thought that the restriction factor of characteristic improvement can be another parameter depending on reference selection, and thus it is preferable to determine the restriction factor when performing optimization like the present method.

Note that, in the embodiments, the modification, the calculation results, and the example described above, an optical fiber has a step-type or trench-type refractive index profile, but these are exemplary preferred examples. In other words, the present disclosure is not limited thereto but includes a case in which, for example, the effects of the present disclosure are obtained with the step type or the trench type by using parameters different from those above-described. In addition, the present disclosure also includes, other than the step type and the trench type, a case in which a small-diameter optical fiber having high versatile characteristics is achieved employing a core portion having the above-described optimum structure. For example, the present disclosure certainly includes an optical fiber having what is called a W-type refractive index profile in which the trench layer is adjacent to the core portion in the trench type as described in the second embodiment. In this case, it is preferable to design the trench layer so that the trench layer provides change in an allowable range to optical properties achieved by the core portion having the optimum structure. In addition, as another embodiment, Δ+ layer may be provided at a position favorable for the core portion having the optimum structure. Here, the Δ+ layer is a layer surrounding the core portion and having a positive relative refractive-index difference with respect to the reference refractive index region of the cladding portion. With such an optical fiber according to the present disclosure, it is possible to excellently achieve a small-diameter optical fiber having a reduced leakage loss and satisfying various reference standards.

Note that the present disclosure is not limited by the above-described embodiments. The present disclosure includes a configuration as a combination of above-described components as appropriate. In addition, further effects and modifications can be easily derived by the skilled person in the art. Thus, a broader aspect of the present disclosure is not limited to the above-described embodiments but can have various changes.

INDUSTRIAL APPLICABILITY

An optical fiber according to the present disclosure can be excellently used for signal transmission.

According to the present disclosure, an effect of achieving a small-diameter optical fiber having a reduced leakage loss is obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber comprising:
a core portion made of glass; and
a cladding portion made of glass, having a refractive index lower than the refractive index of the core portion, and positioned on an outer periphery of the core portion, wherein;
the cladding portion has an outer diameter smaller than 100 μm, the core portion has a relative refractive-index difference of 0.32% to 0.40% with respect to the cladding portion,
the core portion has a core diameter of 7 μm to 10 μm, the cladding portion includes:
an adjacent region that is adjacent to the outer periphery of the core portion, and
a non-adjacent region positioned on an outer periphery of the adjacent region, the adjacent region is interposed between the non-adjacent region and the core portion, the adjacent region is made of pure silica glass, and
b/a is equal to or larger than three where 2a represents a core diameter of the core portion and 2b represents an inner diameter of a trench layer which forms the non-adjacent region.

2. The optical fiber according to claim 1, wherein
the core portion has a relative refractive-index difference of 0.335% to 0.375%, and
the core portion has a core diameter of 8.2 μm to 9.2 μm.

3. The optical fiber according to claim 1, wherein
the core portion has a relative refractive-index difference of 0.37% to 0.395%, and
the core portion has a core diameter of 7.6 μm to 8.3 μm.

4. The optical fiber according to claim 1, wherein
the width of the trench layer, which is given as c−b, is 0.2 to 1 time larger than a,
where 2a represents a core diameter of the core portion, 2b represents an inner diameter of the trench layer, and 2c represents an outer diameter of the trench layer.

5. The optical fiber according to claim 1, wherein the trench layer has a relative refractive-index difference equal to or smaller than −0.4% with respect to the adjacent region.

6. The optical fiber according to claim 1, wherein
the trench layer has a relative refractive-index difference equal to or larger than −0.1% and smaller than 0% with respect to the cladding portion except for the trench layer.

7. The optical fiber according to claim 1, wherein the optical fiber has a mode field diameter of 8.6 μm to 9.5 μm at a wavelength of 1310 nm.

8. The optical fiber according to claim 1, wherein the optical fiber has a bending loss equal to or smaller than $5.3 \times 10^{-3}$ dB/m at a wavelength of 1550 nm when bent at a diameter of 60 mm.

9. The optical fiber according to claim 1, wherein the optical fiber has a zero-dispersion wavelength of 1300 nm to 1324 nm and a dispersion slope equal to or smaller than 0.092 ps/nm2/km at the zero-dispersion wavelength.

10. The optical fiber according to claim 1, wherein the optical fiber has a cable cutoff wavelength equal to or shorter than 1260 nm.

11. The optical fiber according to claim 1, wherein the optical fiber has a mode field diameter equal to or larger than 9.5 tm at a wavelength of 1550 nm.

12. The optical fiber according to claim 1, wherein the optical fiber has a cable cutoff wavelength equal to or shorter than 1530 nm.

* * * * *